United States Patent
Khoshnevisan et al.

(10) Patent No.: US 11,800,529 B2
(45) Date of Patent: Oct. 24, 2023

(54) OVERLAPPING SEMI-PERSISTENT SCHEDULING FOR MULTIPLE TRANSMIT RECEIVE POINTS

(71) Applicant: QUALCOMM Incorporated, San Diego, CA (US)

(72) Inventors: Mostafa Khoshnevisan, San Diego, CA (US); Seyed Ali Akbar Fakoorian, San Diego, CA (US); Seyedkianoush Hosseini, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 17/209,081

(22) Filed: Mar. 22, 2021

(65) Prior Publication Data

US 2021/0307050 A1    Sep. 30, 2021

Related U.S. Application Data

(60) Provisional application No. 62/994,044, filed on Mar. 24, 2020.

(51) Int. Cl.
*H04L 5/00* (2006.01)
*H04W 72/23* (2023.01)
*H04W 72/51* (2023.01)

(52) U.S. Cl.
CPC ........... *H04W 72/23* (2023.01); *H04L 5/0055* (2013.01); *H04W 72/51* (2023.01)

(58) Field of Classification Search
CPC ...... H04W 72/23; H04W 72/51; H04L 5/0055
See application file for complete search history.

(56) References Cited

U.S. PATENT DOCUMENTS

| 2020/0068595 A1 | 2/2020 | Dinan et al. |
| 2021/0022167 A1 | 1/2021 | Khoshnevisan |

(Continued)

FOREIGN PATENT DOCUMENTS

| WO | WO-2018228487 A1 | 12/2018 | |
| WO | WO-2020264450 A1 * | 12/2020 | ............ H04B 7/024 |

(Continued)

OTHER PUBLICATIONS

CATT: "Discussion on PUSCH Resource Collision and DL SPS Enhancement", 3GPP TSG RAN WG1 Meeting #98, 3GPP Draft; R1-1908600, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26-30, 2019, Aug. 17, 2019 (Aug. 17, 2019), pp. 1-8, XP051765208, Retrieved from the Internet: URL: http://www.3gpp.org/ftp/tsg_ran/WG1_RL1/TSGR1_98/Docs/R1-1908600.zip, [retrieved on Aug. 17, 2019], The whole document.

(Continued)

*Primary Examiner* — Michael J Moore, Jr.
(74) *Attorney, Agent, or Firm* — Harrity & Harrity, LLP

(57) ABSTRACT

Various aspects of the present disclosure generally relate to wireless communication. In some aspects, a user equipment (UE) may receive a message for a semi-persistent scheduling (SPS) configuration that corresponds to an SPS configuration index. The UE may determine a control resource set (CORESET) pool index value from the message and associate a CORESET pool index value of an SPS physical downlink shared channel with the CORESET pool index value of the message. Numerous other aspects are provided.

24 Claims, 11 Drawing Sheets

700 ⟶

(56) References Cited

U.S. PATENT DOCUMENTS

| | | | | |
|---|---|---|---|---|
| 2021/0135946 A1* | 5/2021 | Babaei | | H04L 1/1896 |
| 2021/0307050 A1* | 9/2021 | Khoshnevisan | | H04W 72/51 |
| 2022/0361215 A1* | 11/2022 | Khoshnevisan | | H04L 5/0094 |
| 2022/0393829 A1* | 12/2022 | Kim | | H04L 1/18 |
| 2022/0400496 A1* | 12/2022 | Gerami | | H04W 72/1263 |
| 2023/0065992 A1* | 3/2023 | Khoshnevisan | | H04W 72/21 |

FOREIGN PATENT DOCUMENTS

| | | | | |
|---|---|---|---|---|
| WO | WO-2021033116 A1 * | 2/2021 | | H04L 1/1854 |
| WO | WO-2021066631 A1 | 4/2021 | | |

OTHER PUBLICATIONS

International Search Report and Written Opinion—PCT/US2021/070298—ISA/EPO—dated Jun. 25, 2021.

Samsung: "On Rel.16 multi-TRP/Panel Transmission", 3GPP TSG RAN WG1#101-e, 3GPP Draft, R1-2003881, 3rd Generation Partnership Project (3GPP), Mobile Competence Centre, 650, Route Des Lucioles, F-06921 Sophia-Antipolis Cedex, France, vol. RAN WG1. No. e-Meeting, May 25-Jun. 5, 2020, May 15, 2020 (May 15, 2020), 14 Pages, XP051885647, Retrieved from the Internet: URL: https://ftp.3gpp.org/tsg_ran/WG1_RL1/TSGR1_101-e/Docs/R1-2003881.zip, R1-2003881 multT-TRP.docx [retrieved on May 15, 2020], The whole document.

\* cited by examiner

OVERLAPPING SEMI-PERSISTENT SCHEDULING FOR MULTIPLE TRANSMIT RECEIVE POINTS

CROSS-REFERENCE TO RELATED APPLICATION

This Patent Application claims priority to U.S. Provisional Patent Application No. 62/994,044, filed on Mar. 24, 2020, entitled "OVERLAPPING SEMI-PERSISTENT SCHEDULING FOR MULTIPLE TRANSMISSION RECEPTION POINTS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for overlapping semi-persistent scheduling for multiple transmit receive points.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication, performed by a user equipment (UE), may include receiving a message for a semi-persistent scheduling (SPS) configuration that corresponds to an SPS configuration index. The method may include determining a control resource set (CORESET) pool index value from the message and associating a CORESET pool index value of an SPS physical downlink shared channel (PDSCH) with the CORESET pool index value of the message.

In some aspects, a method of wireless communication, performed by a UE, may include determining that a first SPS PDSCH corresponding to a first SPS configuration index overlaps with a second SPS PDSCH corresponding to a second SPS configuration index. The method may include receiving one or more of the first SPS PDSCH and the second SPS PDSCH based at least in part on a determination of whether a first CORESET pool index value associated with the first SPS configuration index and a second CORESET pool index value associated with the second SPS configuration index are different.

In some aspects, a method of wireless communication, performed by a base station, may include transmitting a message, to a UE, in a CORESET to one or more of activate an SPS configuration with an SPS configuration index or release the SPS configuration. The SPS configuration may be associated with a CORESET pool index value of the CORESET. The method may include receiving a hybrid automatic repeat request acknowledgement (HARQ-ACK) message based at least in part on transmitting the message.

In some aspects, a UE for wireless communication may include a memory and one or more processors operatively coupled to the memory. The memory and the one or more processors may be configured to receive a message for an SPS configuration that corresponds to an SPS configuration index, determine a CORESET pool index value from the message, and associate a CORESET pool index value of an SPS PDSCH with the CORESET pool index value of the message.

In some aspects, a UE for wireless communication may include a memory and one or more processors operatively coupled to the memory. The memory and the one or more processors may be configured to determine that a first SPS PDSCH corresponding to a first SPS configuration index overlaps with a second SPS PDSCH corresponding to a second SPS configuration index, and receive one or more of the first SPS PDSCH and the second SPS PDSCH based at least in part on a determination of whether a first CORESET pool index value associated with the first SPS configuration index and a second CORESET pool index value associated with the second SPS configuration index are different.

In some aspects, a base station for wireless communication may include a memory and one or more processors operatively coupled to the memory. The memory and the one or more processors may be configured to transmit a message, to a UE, in a CORESET to one or more of activate an SPS configuration with an SPS configuration index or release the SPS configuration, the SPS configuration being associated with a CORESET pool index value of the CORESET, and receive a HARQ-ACK message based at least in part on transmitting the message.

In some aspects, a non-transitory computer-readable medium may store one or more instructions for wireless communication. The one or more instructions, when executed by one or more processors of a UE, may cause the one or more processors to receive a message for an SPS configuration that corresponds to an SPS configuration index, determine a CORESET pool index value from the message, and associate a CORESET pool index value of an SPS PDSCH with the CORESET pool index value of the message.

In some aspects, a non-transitory computer-readable medium may store one or more instructions for wireless communication. The one or more instructions, when executed by one or more processors of a UE, may cause the one or more processors to determine that a first SPS PDSCH corresponding to a first SPS configuration index overlaps with a second SPS PDSCH corresponding to a second SPS configuration index, and receive one or more of the first SPS PDSCH and the second SPS PDSCH based at least in part on a determination of whether a first CORESET pool index value associated with the first SPS configuration index and a second CORESET pool index value associated with the second SPS configuration index are different.

In some aspects, a non-transitory computer-readable medium may store one or more instructions for wireless communication. The one or more instructions, when executed by one or more processors of a base station, may cause the one or more processors to transmit a message, to a UE, in a CORESET to one or more of activate an SPS configuration with an SPS configuration index or release the SPS configuration, the SPS configuration being associated with a CORESET pool index value of the CORESET, and receive a HARQ-ACK message based at least in part on transmitting the message.

In some aspects, an apparatus for wireless communication may include means for receiving a message for an SPS configuration that corresponds to an SPS configuration index, means for determining a CORESET pool index value from the message, and means for associating a CORESET pool index value of an PDSCH with the CORESET pool index value of the message.

In some aspects, an apparatus for wireless communication may include means for determining that a first SPS PDSCH corresponding to a first SPS configuration index overlaps with a second SPS PDSCH corresponding to a second SPS configuration index, and means for receiving one or more of the first SPS PDSCH and the second SPS PDSCH based at least in part on a determination of whether a first CORESET pool index value associated with the first SPS configuration index and a second CORESET pool index value associated with the second SPS configuration index are different.

In some aspects, an apparatus for wireless communication may include means for transmitting a message, to a UE, in a CORESET to one or more of activate an SPS configuration with an SPS configuration index or release the SPS configuration, the SPS configuration being associated with a CORESET pool index value of the CORESET, and means for receiving a HARQ-ACK message based at least in part on transmitting the message.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
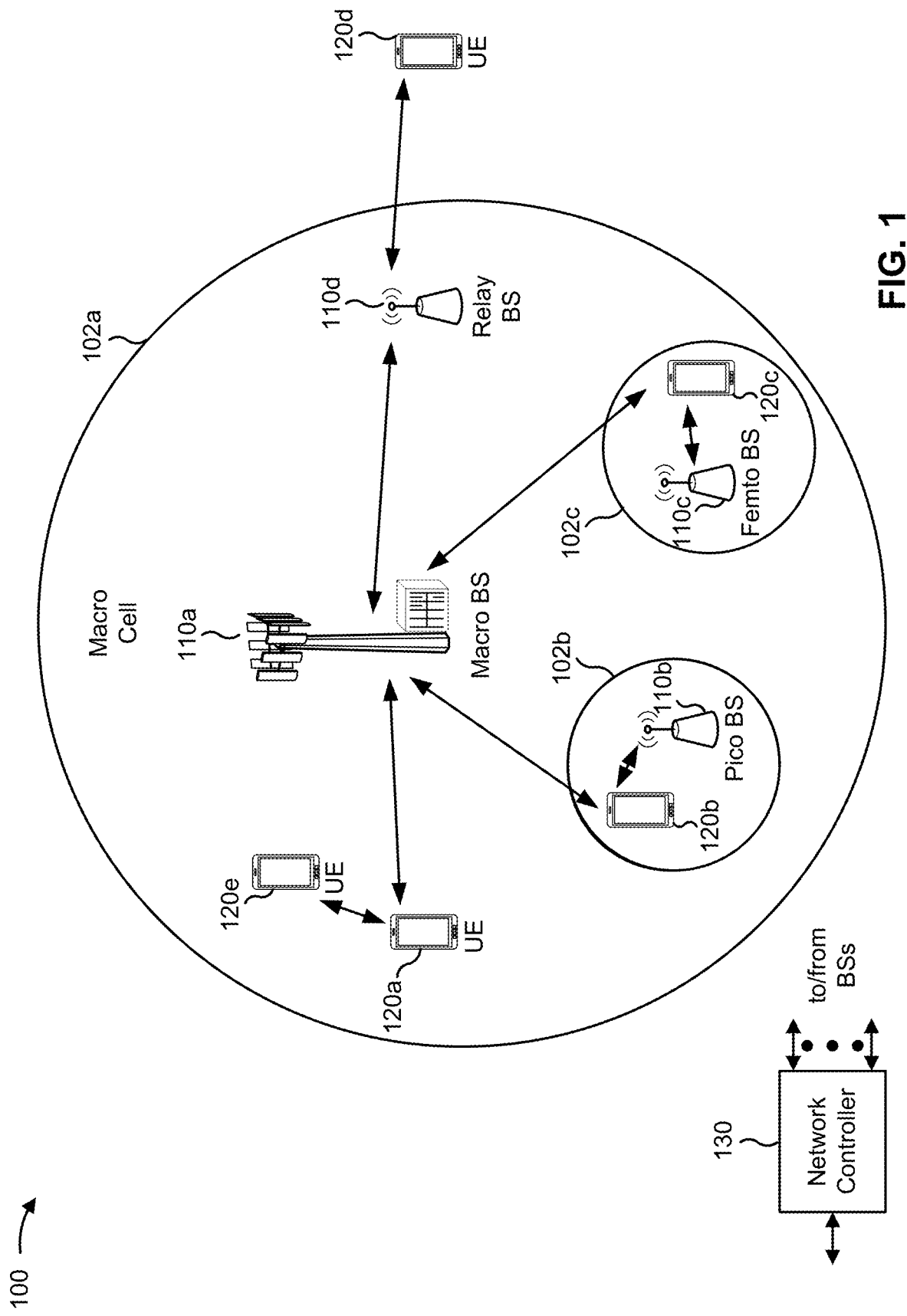
FIG. 1 is a block diagram conceptually illustrating an example of a wireless communication network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internetof-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

Figure 2:
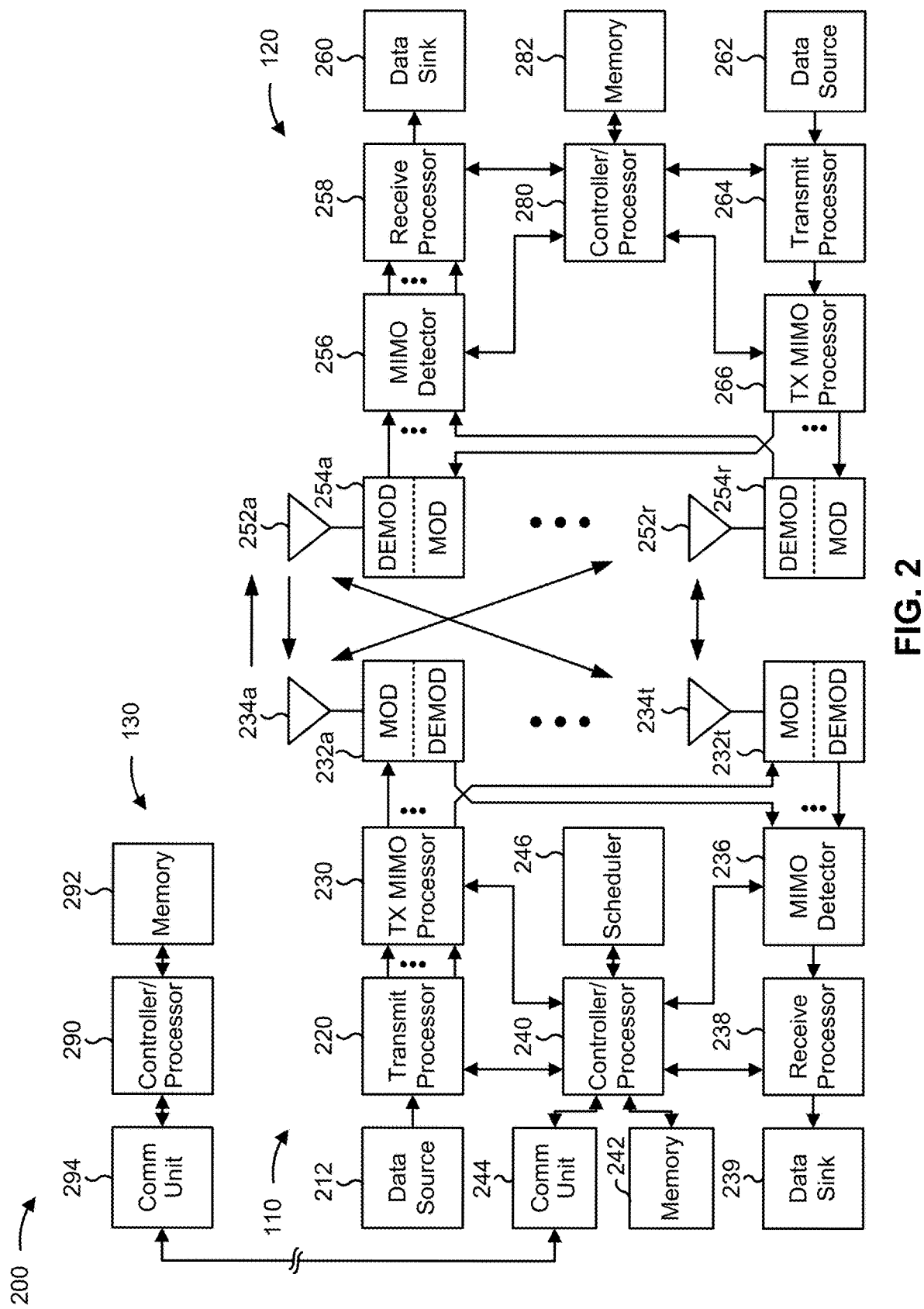
FIG. 2 is a block diagram conceptually illustrating an example of a base station in communication with a user equipment (UE) in a wireless communication network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 1-11).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 1-11).

Controller/processor 240 of base station 110, controller/processor 280 of UE 120, and/or any other component(s) of FIG. 2 may perform one or more techniques associated with overlapping semi-persistent scheduling (SPS) for multiple TRPs, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, process 1100 of FIG. 11, and/or other processes as described herein. In some aspects, executing instructions may include running the instructions, converting the instructions, compiling the instructions, and/or interpreting the instructions, among other examples.

In some aspects, UE 120 may include means for receiving a message for an SPS configuration that corresponds to an SPS configuration index, means for determining a control resource set (CORESET) pool index value from the message, and/or means for associating a CORESET pool index value of an SPS PDSCH with the CORESET pool index value of the message. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

In some aspects, UE 120 may include means for determining that a first SPS PDSCH corresponding to a first SPS configuration index overlaps with a second SPS PDSCH corresponding to a second SPS configuration index, and/or means for receiving one or more of the first SPS PDSCH and the second SPS PDSCH based at least in part on a determination of whether a first CORESET pool index value associated with the first SPS configuration index and a second CORESET pool index value associated with the second SPS configuration index are different. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

In some aspects, base station 110 may include means for transmitting a message, to a UE, in a CORESET to one or more of activate an SPS configuration with an SPS configuration index or release the SPS configuration, the SPS configuration being associated with a CORESET pool index value of the CORESET, and/or means for receiving a hybrid automatic repeat request acknowledgement (HARQ-ACK) message based at least in part on transmitting the message. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
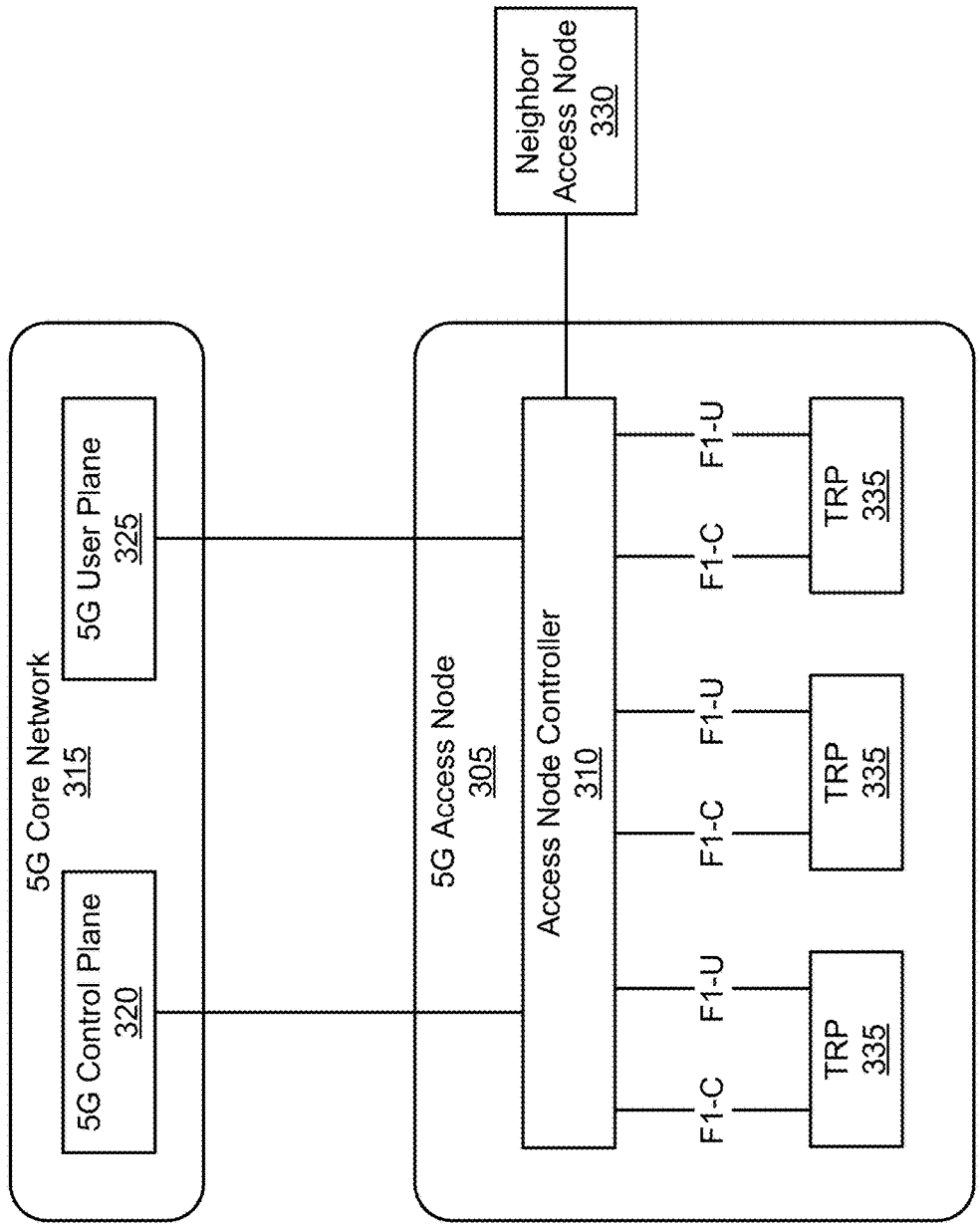
FIG. 3 illustrates an example logical architecture of a distributed radio access network, in accordance with the present disclosure.

FIG. 3 illustrates an example logical architecture of a distributed radio access network (RAN) 300, in accordance with the present disclosure.

A 5G access node 305 may include an access node controller 310. Access node controller 310 may be a central unit (CU) of distributed RAN 300. In some aspects, a backhaul interface to a 5G core network 315 may terminate at access node controller 310. 5G core network 315 may include a 5G control plane component 320 and a 5G user plane component 325 (e.g., a 5G gateway), and the backhaul interface for one or both of the 5G control plane and the 5G user plane may terminate at access node controller 310. Additionally, or alternatively, a backhaul interface to one or more neighbor access nodes 330 (e.g., another 5G access node 305, an LTE access node) may terminate at access node controller 310.

Access node controller 310 may include and/or may communicate with one or more TRPs 335 (e.g., via an F1 Control (F1-C) interface and/or an F1 User (F1-U) interface). A TRP 335 may be a distributed unit (DU) of distributed RAN 300. In some aspects, a TRP 335 may correspond to BS 110 described above in connection with FIG. 1. For example, different TRPs 335 may be included in different BSs 110. Additionally, or alternatively, multiple TRPs 335 may be included in a single BS 110. In some aspects, a BS 110 may include a CU (e.g., access node controller 310) and/or one or more DUs (e.g., one or more TRPs 335). In some cases, a TRP 335 may be referred to as a cell, a panel, an antenna array, and/or an array.

A TRP 335 may be connected to a single access node controller 310 or to multiple access node controllers 310. In some aspects, a dynamic configuration of split logical functions may be present within the architecture of distributed RAN 300. For example, a packet data convergence protocol (PDCP) layer, a radio link control (RLC) layer, a medium access control (MAC) layer, and/or the like may be configured to terminate at the access node controller 310 or at a TRP 335.

In some aspects, multiple TRPs 335 may transmit communications (e.g., the same communication or different communications) in the same transmission time interval (TTI) (e.g., a slot, a mini-slot, a subframe, a symbol) or different TTIs using different quasi-co-location (QCL) relationships (e.g., different spatial parameters, different transmission configuration indicator (TCI) states, different precoding parameters, different beamforming parameters). In some aspects, a TCI state may be used to indicate one or more QCL relationships. A TRP 335 may be configured to individually (e.g., using dynamic selection) or jointly (e.g., using joint transmission with one or more other TRPs 335) serve traffic to a UE 120 (depicted in FIGS. 1 and 2).

As indicated above, FIG. 3 is provided as an example. Other examples may differ from what was described with regard to FIG. 3.

Figure 4:
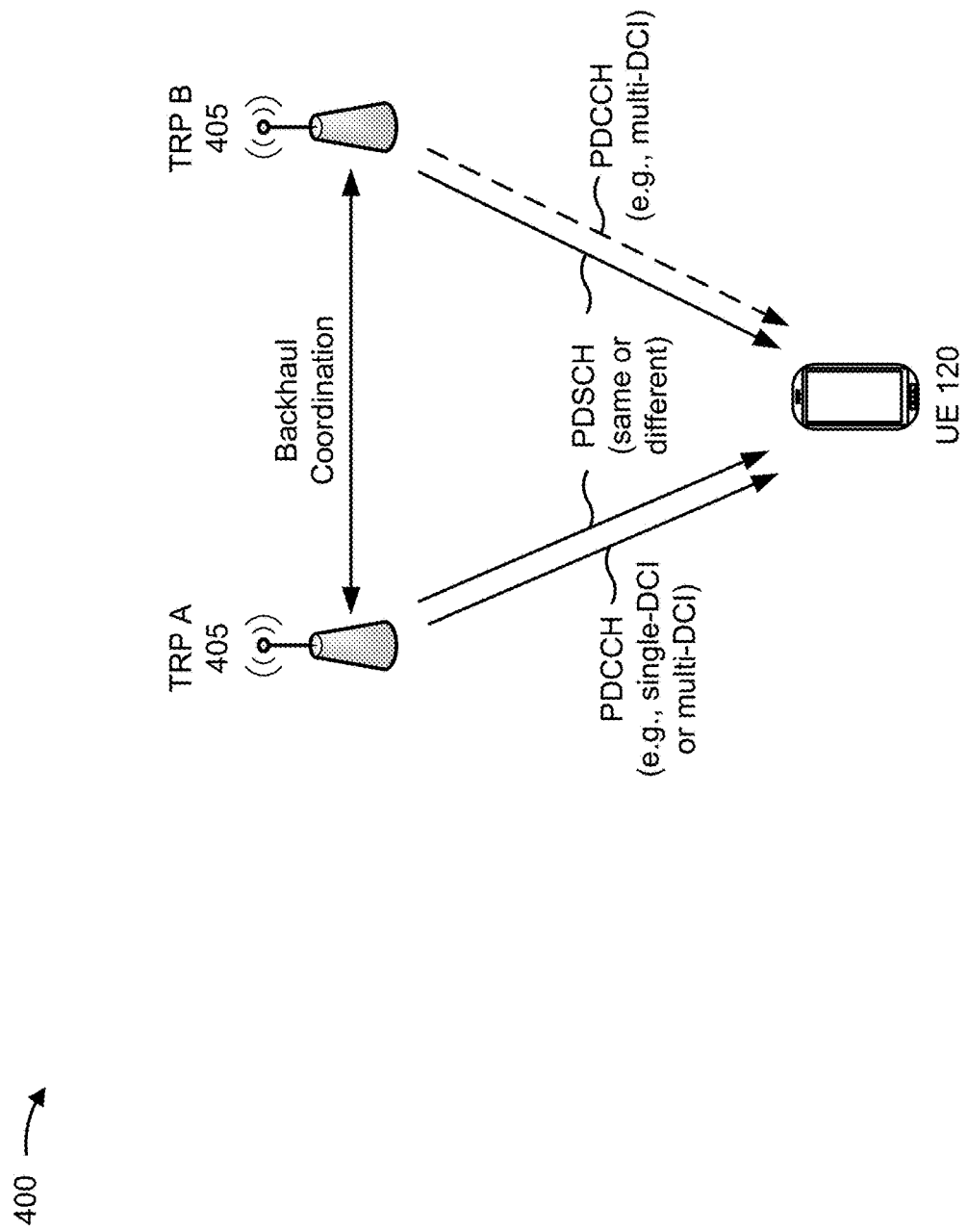
FIG. 4 is a diagram illustrating an example of multi-transmit receive point (mTRP) communication, in accordance with the present disclosure.

FIG. 4 is a diagram illustrating an example 400 of multi-TRP (mTRP) communication (sometimes referred to as multi-panel communication), in accordance with the present disclosure. As shown in FIG. 4, multiple TRPs 405 may communicate with the same UE 120. A TRP 405 may correspond to a TRP 335 described above in connection with FIG. 4.

The multiple TRPs 405 (shown as TRP A and TRP B) may communicate with the same UE 120 in a coordinated manner (e.g., using coordinated multipoint transmissions) to improve reliability, and/or increase throughput. TRPs 405 may coordinate such communications via an interface between TRPs 405 (e.g., a backhaul interface, an access node controller 310). The interface may have a smaller delay and/or higher capacity when TRPs 405 are co-located at the same BS 110 (e.g., when TRPs 405 are different antenna arrays or panels of the same BS 110), and may have a larger delay and/or lower capacity (as compared to co-location) when TRPs 405 are located at different BSs 110. The different TRPs 405 may communicate with UE 120 using different QCL relationships (e.g., different TCI states), DMRS ports, and/or different layers (e.g., of a multi-layer communication).

In a first mTRP transmission mode, a single physical downlink control channel (PDCCH) may be used to schedule downlink data communications for a single physical downlink shared channel (PDSCH). In this case, multiple TRPs 405 (e.g., TRP A and TRP B) may transmit communications to UE 120 on the same PDSCH. For example, a communication may be transmitted using a single codeword with different spatial layers for different TRPs 405 (e.g., where one codeword maps to a first set of layers transmitted by a first TRP 405 and maps to a second set of layers transmitted by a second TRP 405). As another example, a communication may be transmitted using multiple codewords, where different codewords are transmitted by different TRPs 405 (e.g., using different sets of layers). In either case, different TRPs 405 may use different QCL relationships (e.g., different TCI states) for different DMRS ports corresponding to different layers. For example, a first TRP 405 may use a first QCL relationship or a first TCI state for a first set of DMRS ports corresponding to a first set of layers, and a second TRP 405 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0, DCI format 1_1, and/or the like) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for mTRP transmission as discussed herein) in this mTRP transmission mode (e.g., single-DCI).

In a second mTRP transmission mode (e.g., multi-DCI), multiple PDCCHs may be used to schedule downlink data communications for multiple corresponding PDSCHs (e.g., one PDCCH for each PDSCH). In this case, a first PDCCH may schedule a first codeword to be transmitted by a first TRP 405, and a second PDCCH may schedule a second codeword to be transmitted by a second TRP 405. Furthermore, first DCI (e.g., transmitted by the first TRP 405) may schedule a first PDSCH communication associated with a first set of DMRS ports with a first QCL relationship (e.g., indicated by a first TCI state) for the first TRP 405, and second DCI (e.g., transmitted by the second TRP 405) may schedule a second PDSCH communication associated with a second set of DMRS ports with a second QCL relationship (e.g., indicated by a second TCI state) for the second TRP 405. In this case, DCI (e.g., having DCI format 1_0, DCI format 1_1) may indicate a corresponding TCI state for a TRP 405 corresponding to the DCI. The TCI field of a DCI indicates the corresponding TCI state (e.g., the TCI field of the first DCI indicates the first TCI state and the TCI field of the second DCI indicates the second TCI state).

As indicated above, FIG. 4 is provided as an example. Other examples may differ from what is described with respect to FIG. 4.

Figure 5:
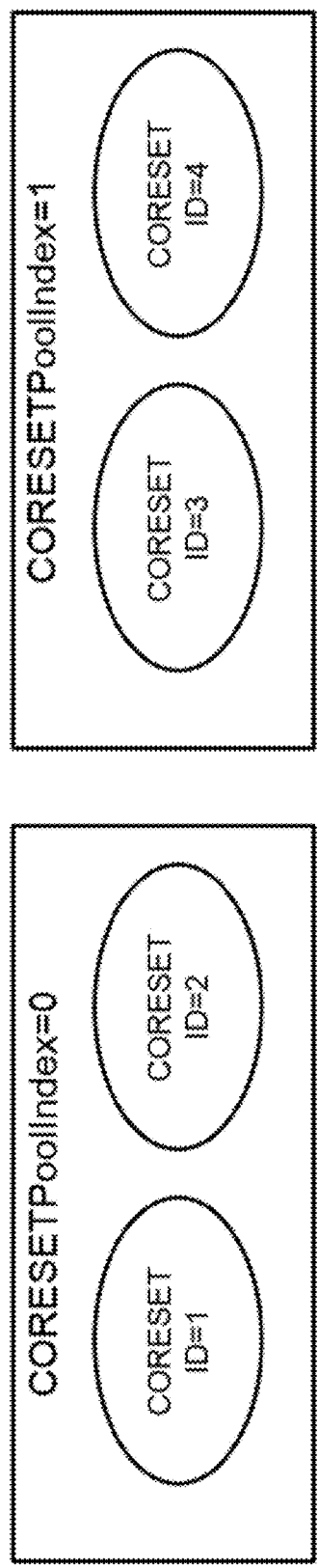
FIG. 5 is a diagram illustrating an example of control resource set pool indices, in accordance with the present disclosure.

FIG. 5 is a diagram illustrating an example 500 of CORESET pool indices, in accordance with the present disclosure.

In some aspects, UE 120 may differentiate TRPs based at least in part on a CORESET pool index (CORESETPoolIndex) value. Each CORESET (of a maximum of 5 CORESETs) may be configured with a CORESET pool index value of 0 or 1. This groups the CORESETs into two groups. Different TRPs may be transparent to UE 120, and a TRP may determine whether UE 120 is configured for multi-DCI-based mTRP.

A CORESET pool index of a CORESET in which a DCI is received may be used for different purposes, such as HARQ-ACK codebook construction and transmission, PDSCH scrambling, and/or rate matching. FIG. 5 shows two CORESET pool indices—a CORESET pool index with a value of 0 and a CORESET pool index with a value of 1. CORESET pool index 0 associated with CORESETs 1 and 2. CORESET pool index 1 includes CORESETs 3 and 4. A UE may be configured by a higher layer parameter (PDCCH-Config), which contains two different values of CORESET pool index in CORESETs for an active bandwidth part (BWP) of a serving cell.

Two PDSCHs associated with different CORESET pool index values (scheduled by corresponding DCIs received in CORESETs with different CORESET pool index values) can partially or fully overlap in a time domain. Otherwise, two PDSCHs cannot overlap. The UE may expect reception of full or partially-overlapped PDSCHs in time when PDCCHs that schedule two PDSCHs are associated with different CORESETs having different CORESET pool index values. For a CORESET without a CORESET pool index value, the UE may determine that the CORESET is assigned a CORESET pool index value of 0.

If PDCCHs that schedule corresponding PDSCHs are associated with the same or different CORESETs having the same value of CORESET pool index, the UE may follow a procedure for receiving the PDSCH upon detection of a PDCCH. The procedure may include generating a type 1 HARQ-ACK codebook for a first set $S_0$ of serving cells (serving cells that are configured with first CORESETs associated with CORESET pool index value 0) and separately generating a type 1 HARQ-ACK codebook for a second set $S_1$ of serving cells (serving cells that are configured with second CORESETs associated with CORESET pool index value 1). The HARQ-ACK codebooks for set $S_0$ and for set $S_1$ may be concatenated to obtain a total quantity of HARQ-ACK information bits. For example, a serving cell that is configured with different CORESETs associated with different values of CORESET pool index appears in both $S_0$ and $S_1$.

The UE may determine HARQ-ACK feedback referred to as type 1 HARQ-ACK codebook (semi-static codebook). For each component carrier (CC), the UE may determine a set of occasions for candidate PDSCH reception. For each CC, if a PDSCH is received in an occasion for candidate PDSCH reception, HARQ-ACK for the PDSCH is inserted in a corresponding location. Otherwise, a negative acknowledgement (NACK) is inserted. For HARQ-ACK for SPS release, a location in a type 1 HARQ-ACK codebook for HARQ-ACK information corresponding to a single SPS PDSCH release is the same as for a corresponding SPS PDSCH reception. For multi-DCI (when joint feedback is configured), a CC that is configured with multi-DCI appears one time in $S_0$ and another time in $S_1$.

The UE may also determine HARQ-ACK feedback referred to as type 2 HARQ-ACK feedback. A set of PDCCH monitoring occasions may be determined across all CCs. For each PDCCH monitoring occasion, a codebook may be determined based at least in part on downlink assignment index (DAI) values in DCIs that schedule corresponding PDSCHs received in the PDCCH monitoring occasion across all CCs. In this case, HARQ-ACK for SPS PDSCH is appended to the codebook (note that SPS does not have a DAI). If a single SPS PDSCH reception is activated for a UE and the UE is configured to receive SPS PDSCH in a slot for a serving cell, the UE may generate a HARQ-ACK information bit associated with the SPS PDSCH reception.

For multi-DCI when joint feedback is configured (ACK/NACK feedback mode is set to joint feedback), a CC that is configured with multi-DCI (configured with different CORESETs associated with different CORESET pool index values) may be counted two times. For example, the UE may separately consider DCIs received in CORESETS associated with a first CORESET pool index value and DCIs received in CORESETs associated with a second CORESET pool index value. If, for an active DL BWP of a serving cell, the UE is not provided a CORESET pool index or is provided a CORESET pool index value of 0 for one or more first CORESETs and is provided a CORESET pool index with a value of 1 for one or more second CORESETs, the serving cell may be counted two times. A first time may correspond to the first CORESET pool index value and a second time may correspond to the second CORESET pool index value.

As indicated above, FIG. 5 is provided as an example. Other examples may differ from what is described with respect to FIG. 5.

Figure 6:
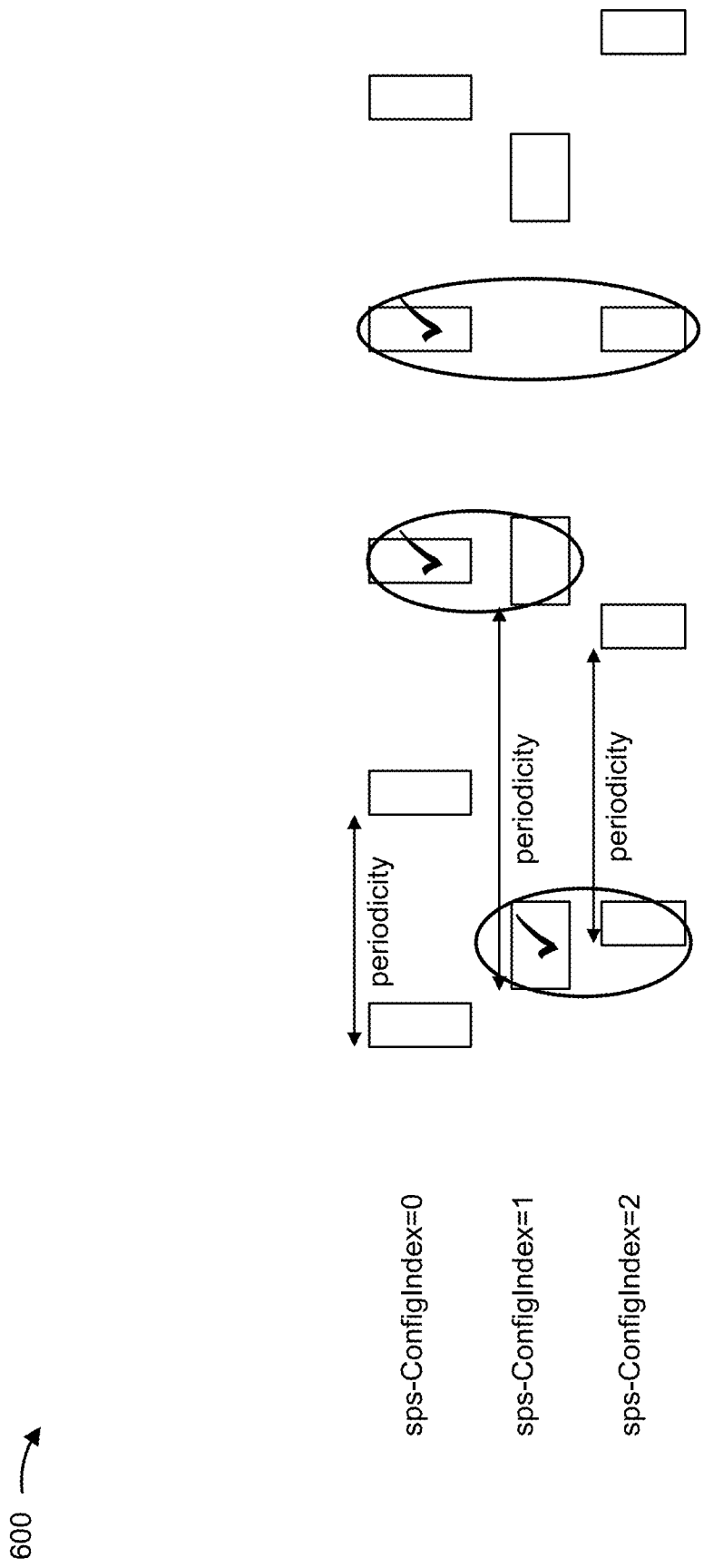
FIG. 6 is a diagram illustrating an example of multiple semi-persistent scheduling (SPS) configurations, in accordance with the present disclosure.

FIG. 6 is a diagram illustrating an example 600 of multiple SPS configurations, in accordance with the present disclosure.

An SPS configuration may be used for to specify how and when a UE may use resource allocations or grants as part of SPS scheduling. Each SPS configuration may be configured with an SPS configuration index (sps-ConfigIndex) and/or a periodicity. An SPS configuration may be activated by a DCI (with a cyclic redundancy check scrambled with a configured scheduling random network temporary identifier and new data indicator of 0). A HARQ process number field in the DCI may be repurposed for indicating an SPS configuration index that is activated.

FIG. 6 shows SPS configuration index 0, SPS configuration index 1, and SPS configuration index 2. When multiple SPS PDSCHs overlap in time, a UE may receive one of them (corresponding to a lowest SPS configuration index). If there is more than one PDSCH on a serving cell, each without a corresponding PDCCH transmission, partially or fully overlapping in time, a UE may not be required to receive a PDSCH among these PDSCHs other than the one with the lowest SPS configuration index.

HARQ-ACK may be configured for multiple SPS configurations. A HARQ-ACK for only SPS PDSCHs (HARQ-ACK for PDSCH scheduled by a DCI is not included) may involve a procedure. According to the procedure, if a UE is configured to receive an SPS PDSCH in a slot for SPS PDSCH configurations on a serving cell, and the SPS PDSCH is required to be received among overlapping SPS PDSCHs or based at least in part on a UE capability for a number of PDSCH receptions in a slot for an SPS PDSCH reception, the UE may generate a HARQ-ACK information bit for the SPS PDSCH reception. As explained above, the HARQ-ACK is generated for all received SPS PDSCHs corresponding to different SPS configurations in each CC, and the procedure is repeated for all CCs.

The UE may generate type 1 HARQ-ACK codebook as described in connection with FIG. 5, except that a location in a type 1 HARQ-ACK codebook for HARQ-ACK information corresponding to multiple SPS PDSCH releases by a single DCI format may be the same as for a corresponding SPS PDSCH reception with the lowest SPS configuration index among the multiple SPS PDSCH releases. Note that one SPS release can release SPS for groups of SPS configurations. For type 2 HARQ-ACK feedback, the procedure describe above for the case of HARQ-ACK for only SPS PDSCHs may be used to append HARQ-ACK feedback for SPS PDSCHs to an end of the dynamic codebook.

As indicated above, FIG. 6 is provided as an example. Other examples may differ from what is described with respect to FIG. 6.

A single UE may receive a first PDSCH transmitted from a first TRP and scheduled with a first DCI and a second PDSCH transmitted from a second TRP and scheduled with a second DCI. According to various aspects described herein, a UE may differentiate TRPs with a CORESET pool index. The UE may associate an SPS PDSCH with a CORESET pool index value. The UE may receive DCI for an SPS configuration activation or an SPS release in a CORESET. The UE may determine a CORESET pool index value for an SPS PDSCH based at least in part on a CORESET pool index value of the CORESET. This association between an SPS PDSCH and a CORESET pool index value may provide the UE with clear rules for TRP differentiation when combining multi-DCI-based mTRP features with multiple SPS configurations. As a result, communications between the UE and TRPs with multiple overlapping SPS configurations may be more efficient. Efficient communications may cause the UE and the TRP to conserve processing resources and signaling resources.

Figure 7:
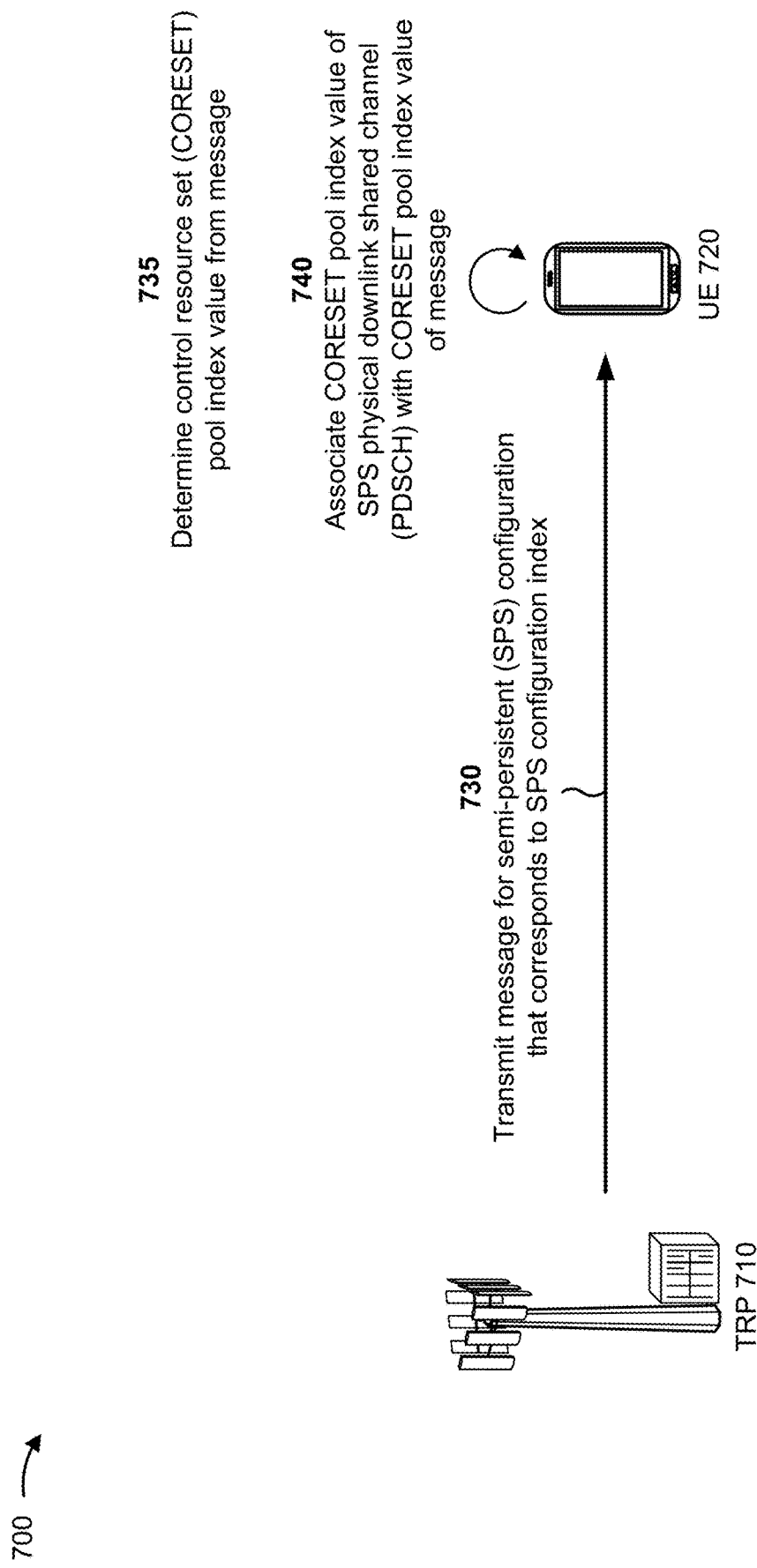
FIG. 7 is a diagram illustrating an example of overlapping SPS for multiple TRPs, in accordance with the present disclosure.

FIG. 7 is a diagram illustrating an example 700 of overlapping SPS for multiple TRPs, in accordance with various aspects of the present disclosure. FIG. 7 shows a TRP 710 (e.g., a BS 110 depicted in FIGS. 1 and 2, a TRP 405 depicted in FIG. 4) and a UE 720 (e.g., UE 120 depicted in FIGS. 1, 2, and 4) that may communicate with one another. TRP 710 may be one of multiple TRPs that each transmit DCI to UE 720.

As shown by reference number 730, TRP 710 may transmit a message for an SPS configuration that corresponds to an SPS configuration index. For example, TRP 710 may transmit an SPS activation message in a DCI. UE 720 may receive the DCI in a CORESET with a CORESET pool index value.

As shown by reference number 735, UE 720 may determine a CORESET pool index value from the CORESET. As shown by reference number 740, UE 720 may associate a CORESET pool index value of an SPS PDSCH with the CORESET pool index value of the CORESET. For example, the CORESET pool index value of the SPS PDSCH may be 0 based at least in part on a determination that the CORESET pool index value for the CORESET is 0, or the CORESET pool index value of the SPS PDSCH may be 1 based at least in part on a determination that the CORESET pool index value for the CORESET is 1. In other words, the same SPS configuration index may be associated with a CORESET pool index value of 0 or 1 at the same time. There may be a difference between actual SPS configurations and SPS configuration indices in a UE capability.

In some aspects, UE 720 may receive another DCI message, in a CORESET with a CORESET pool index value of 1, and activate a new SPS configuration with the SPS configuration index, based at least in part on a determination that the CORESET pool index value for the CORESET is 1. In this case, the same SPS configuration index corresponds to two actual active SPS configurations associated with different values of CORESET pool index. In some aspects, UE 720 may release the (old) SPS configuration and activate the new SPS configuration. In some aspects, each SPS configuration index may not correspond to more than one actual "active" SPS configuration, and the UE may not expect to receive another DCI activation activating the same SPS configuration index in a CORESET with a CORESET pool index value of 1 (this would be an error case).

In some aspects, UE 720 may receive a CORESET pool index value (e.g., 0 or 1) through radio resource control (RRC) signaling in each SPS configuration. In some aspects, UE 720 may activate an SPS configuration of SPS PDSCHs via a corresponding SPS configuration index.

UE 720 may provide some information to TRPs about a capability of UE 720 for handling multiple SPSs. In some aspects, UE 720 may be configured for a maximum quantity of supported SPS configurations in one CC or across multiple CCs. UE 720 may report a UE capability indicating a maximum quantity of SPS configuration indices in a BWP of a CC and/or a maximum quantity of uplink configured grant configuration (UL-CG) indices in a BWP of a CC. Note that UL-CG is an opposite direction and UE capability reporting is applicable to both directions. In a CC/BWP configured with different CORESET pool index values in different CORESETs, an actual number of SPS configurations may be up to twice a reported number of SPS configuration indices. For example, BS 710 may receive a UE capability report indicating a maximum quantity of SPS configuration indices in a BWP of a CC, and determine a maximum quantity of SPS configurations based at least in part on the maximum quantity of SPS configuration indices and a determination of whether a CC is configured for multi-DCI-based mTRP communication. Alternatively, or additionally, BS 710 may receive the UE capability report indicating a maximum quantity of UL-CG indices in a BWP of a CC and determine a maximum quantity of UL-CG configurations based at least in part on the maximum quantity of UL-CG configuration indices and a determination of whether a CC is configured for multi-DCI-based mTRP communication. BS 710, having information about a maximum quantity of SPS configurations or a maximum quantity of UL-CG configurations that UE 720 is capable of handling, may operate so as to not exceed any such maximum. BS 710 may refrain from configuring UE 720 to handle more SPS configurations or more UL-CG configurations than the maximums reported by UE 720 and/or determined by BS 710.

The UE capability report may indicate a maximum quantity of SPS configurations in a BWP of a CC or a maximum quantity of UL-CG configurations in a BWP of a CC. The UE capability report may indicate a maximum quantity of SPS configurations across a plurality of CCs or a maximum quantity of UL-CG configurations across a plurality of CCs. In a CC/BWP configured with different CORESET pool index values in different CORESETs, a quantity of SPS configuration indices may be up to half of a reported number SPS configurations. Each SPS configuration index may be counted two times toward a UE capacity limit in a CC that is configured with multi-DCI based mTRP. These UE capability aspects may be applicable to both SPS and UL-CG.

As indicated above, FIG. 7 is provided as an example. Other examples may differ from what is described with respect to FIG. 7.

Figure 8:
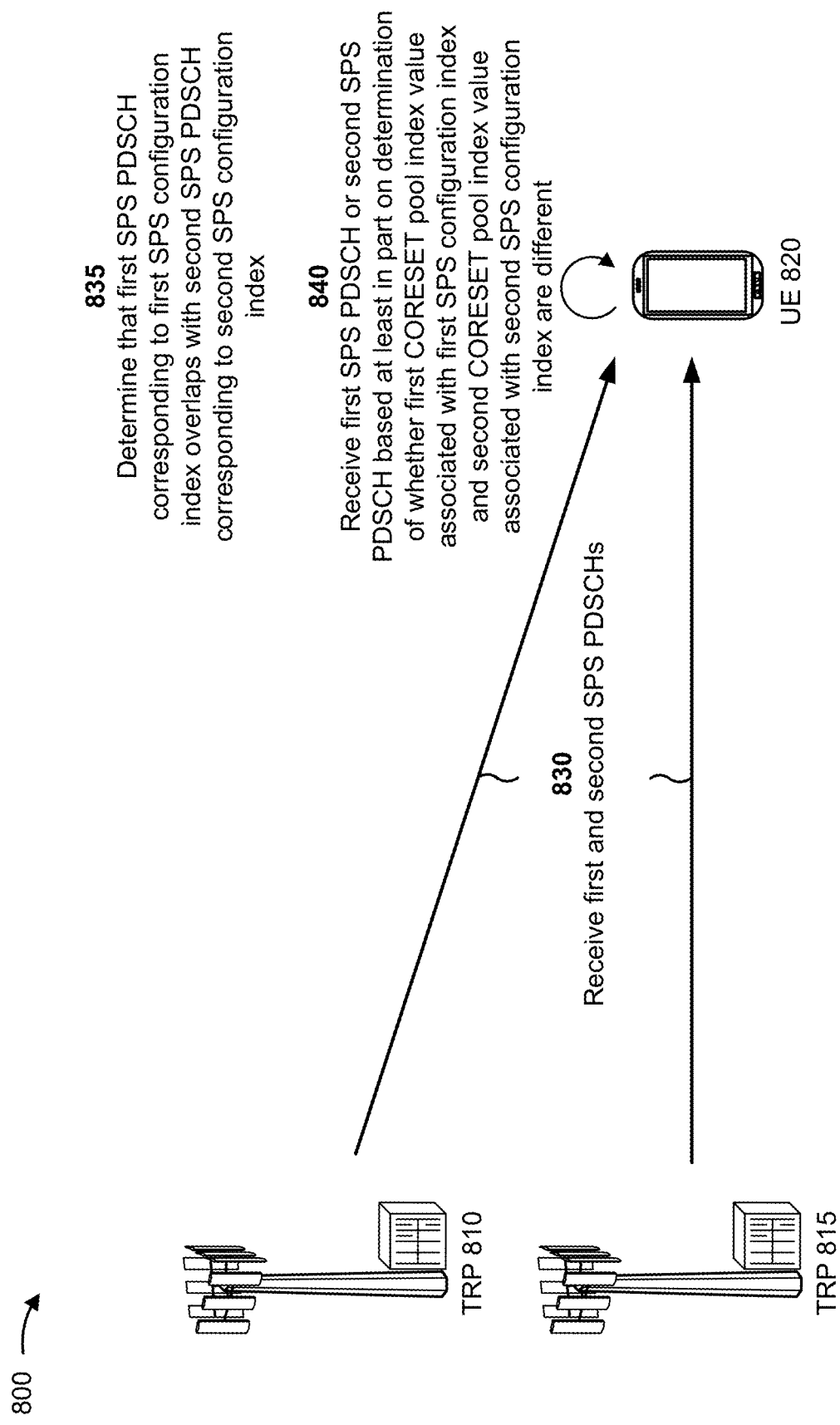
FIG. 8 is a diagram illustrating an example of overlapping SPS for multiple TRPs, in accordance with the present disclosure.

FIG. 8 is a diagram illustrating an example 800 of overlapping SPS for multiple TRPs, in accordance with various aspects of the present disclosure. FIG. 8 shows a TRP 810 and a TRP 815 (e.g., a BS 110 depicted in FIGS. 1 and 2, a TRP 405 depicted in FIG. 4, TRP 710 depicted in FIG. 7) and a UE 820 (e.g., UE 120 depicted in FIGS. 1, 2 and 4, UE 720 depicted in FIG. 7) that may communicate with one another.

As shown by reference number 830, TRP 810 may transmit a first SPS PDSCH and TRP 815 may transmit a second SPS PDSCH. TRP 810 may transmit the first SPS PDSCH associated with a first CORESET pool index value. TRP 815 may transmit the second SPS PDSCH associated with a second CORESET pool index value. The first SPS PDSCH and the second SPS PDSCH may partially or fully overlap, such as shown in FIG. 6.

As shown by reference number 835, UE 820 may determine that the first SPS PDSCH and the second SPS PDSCH overlap. As shown by reference number 840, UE 820 may receive the first SPS PDSCH or the second SPS PDSCH based at least in part on a determination of whether a first CORESET pool index value associated with the first SPS configuration index and a second CORESET pool index value associated with the second SPS configuration index are different. In some aspects, UE 820 may receive both the first SPS PDSCH and the second SPS PDSCH based at least in part on a determination that the first CORESET pool index and the second CORESET pool index are different. In some aspects, UE 820 may receive one of the first SPS PDSCH and the second SPS PDSCH based at least in part on a determination that the first CORESET pool index and the second CORESET pool index are the same.

While two SPS PDSCHs are described in connection with FIG. 8, UE 820 may receive more than two overlapping SPS PDSCHs. With any number of multiple overlapping SPS PDSCHs, if UE 820 receives multiple overlapping SPS PDSCHs, within all overlapping SPS PDSCHs associated with a CORESET pool index value of 0, UE 820 may only receive an SPS PDSCH with the lowest SPS configuration index. Within all overlapping SPS PDSCHs associated with a CORESET pool index value of 1, UE 820 may only receive an SPS PDSCH with the lowest SPS configuration index.

In some aspects, if UE 820 is configured to receive more than one SPS PDSCH on a serving cell (each without a corresponding PDCCH transmission) that are partially or fully overlapping in time and are associated with the same CORESET pool index value, UE 820 may not be required to receive an SPS PDSCH among these SPS PDSCHs other than an SPS PDSCH with the lowest configured SPS configuration index. UE 820 may be expected to receive partially or fully overlapping SPS PDSCHs in a given serving cell if the SPS PDSCHs are associated with different CORESET pool index values.

In some aspects, UE 820 may generate and transmit a HARQ-ACK message. For example, UE 820 may generate first HARQ-ACK feedback for a first SPS PDSCH and second HARQ-ACK feedback for a second SPS PDSCH. UE 820 may transmit the HARQ-ACK message with the first HARQ-ACK feedback and the second HARQ-ACK feedback in the HARQ-ACK message. HARQ-ACK feedback for an SPS PDSCH associated with a CORESET pool index of 0 may be concatenated before HARQ-ACK feedback for an SPS PDSCH associated with a CORESET pool index of 1.

In some aspects, UE 820 may generate HARQ-ACK feedback for multiple SPS PDSCHs depending on a HARQ-ACK codebook type, whether HARQ-ACK feedback is only for the SPS PDSCHs, there are HARQ-ACK bits also for dynamic PDSCH (non-SPS PDSCHs), and/or the like. If HARQ-ACK feedback is only for the SPS PDSCHs (without corresponding PDCCH), UE 820 may generate HARQ-ACK feedback for multiple SPS PDSCHs in each serving cell of two sets (e.g., lists) of serving cells. A first set of serving cells (set $S_0$ includes actual serving cells with SPS configurations associated with CORESET pool index 0) and a second set of serving cells (set $S_1$ includes actual serving cells with SPS configurations associated with CORESET pool index 1). Then, UE 820 concatenates the HARQ-ACK feedback for SPS PDSCHs corresponding to the two sets. HARQ-ACK bits for SPS PDSCHs corresponding to CORESET pool index value 0 (corresponding to the first set $S_0$) are placed first in the HARQ-ACK codebook followed by HARQ-ACK for SPS PDSCHs corresponding to CORESET pool index value 1 (corresponding to the second set $S_1$). Within each set, UE 820 may generate HARQ-ACK bits for multiple SPS PDSCHs, as described above.

In some aspects, for a type 2 (dynamic) HARQ-ACK codebook, UE 820 may append the first HARQ-ACK feedback and the second HARQ-ACK feedback to an end of the dynamic HARQ-ACK codebook. The first HARQ-ACK feedback and the second HARQ-ACK feedback may be generated as explained above corresponding to the first set of serving cells $S_0$ and the second set of serving cells $S_1$. The first HARQ-ACK feedback is for SPS PDSCHs that are associated with CORESET pool index value 0, and the second HARQ-ACK feedback is for SPS PDSCHs that are associated with CORESET pool index value 1.

In some aspects, UE 820 may generate HARQ-ACK feedback for SPS PDSCHs. UE 820 may generate HARQ-ACK feedback for multiple SPS PDSCHs separately for serving cells in set $S_0$ and for serving cells in set $S_1$. For example, UE 820 may generate a type 1 HARQ-ACK codebook for set $S_0$ (serving cells that are configured with first CORESETs associated with CORESET pool index value 0) and separately generate a type 1 HARQ-ACK codebook for set $S_1$ (serving cells that are configured with second CORESETs associated with CORESET pool index value 1). The HARQ-ACK codebooks for set $S_0$ and for set $S_1$ may be concatenated in a HARQ-ACK feedback message. In the HARQ-ACK message, HARQ-ACK feedback (e.g., bit) for SPS PDSCHs corresponding to a CORESET pool index value of 0 is placed first followed by HARQ-ACK (e.g., bit) for SPS PDSCHs corresponding to CORESET pool index value of 1.

HARQ-ACK for receiving SPS PDSCHs is described above in connection with FIG. 8. HARQ-ACK for SPS release is described below. In some aspects, UE 820 may receive an SPS release message in a CORESET and release one or more SPS configurations associated with a CORESET pool index value that matches a CORESET pool index value of the CORESET. UE 820 may generate HARQ-ACK feedback for the SPS release and transmit a HARQ-ACK message including the HARQ-ACK feedback. The HARQ-ACK message may include a first part associated with a first CORESET pool index value and a second part associated with a second CORESET pool index value, wherein the HARQ-ACK feedback is included in either the first part or the second part based at least in part on the CORESET pool index value of the CORESET. For example, the HARQ-CK message may include both $S_0$ (associated with CORESETPoolIndex 0) and $S_1$ (associated with CORESETPoolIndex 1), and the HARQ-ACK feedback for the SPS release may belong to either $S_0$ or $S_1$.

In some aspects, UE 820 may receive an SPS release DCI that releases multiple SPS configurations. UE 820 may determine, for type 1 HARQ-ACK, a HARQ-ACK codebook for set $S_0$ and a HARQ-ACK codebook for set $S_1$ separately and concatenate the HARQ-ACK codebooks in the HARQ-ACK feedback message. In some aspects, an SPS release received in a CORESET associated with a CORESET pool index value may release one or more SPS configurations associated with the same CORESET pool index value.

In some aspects, an SPS release DCI may release one or more SPS configurations that are not associated with the same CORESET pool index value. UE 820 may generate two HARQ-ACK bits for the SPS release DCI, one bit in the set $S_0$ and one bit in the set $S_1$. For example, UE 820 may receive an SPS release DCI that releases one or more SPS configuration indices associated with the first CORESET pool index value and one or more SPS configuration indices associated with the second CORESET pool index value. UE 820 may generate a first HARQ-ACK bit and a second HARQ-ACK bit for the same SPS release DCI (there may be two instances in the HARQ-ACK codebook in this scenario). UE 820 may transmit a HARQ-ACK message including the first HARQ-ACK bit and the second HARQ-ACK bit.

In some aspects, a location of a type 1 HARQ-ACK codebook for HARQ-ACK information corresponding to multiple SPS PDSCH releases by a single DCI format in a serving cell may be the same as for a corresponding SPS PDSCH reception with the lowest SPS configuration index among the multiple SPS PDSCH releases. When the serving cell belongs to both set $S_0$ and set $S_1$, SPS PDSCH releases corresponding to CORESET pool index values of 0 or 1 are considered, respectively, when determining a lowest SPS configuration index among the multiple SPS PDSCH releases. For example, a CC (two values of CORESET pool index configured) may belong to both set $S_0$ and set $S_1$. In that CC, a single DCI may release multiple SPS configuration indices 0, 1, 4, 8, where SPS configuration indices 0, 4 are associated with a CORESET pool index value of 0, and SPS configuration indices 1, 8 are associated with a CORESET pool index value of 1. The following may apply for set $S_0$ and set $S_1$. In set $S_0$, a location of HARQ-ACK feedback for the DCI may be the same as for a corresponding SPS PDSCH reception with an SPS configuration index value of 0 (lowest among 0 and 4). In set $S_1$, a location of HARQ-ACK for the DCI may be the same as for a corresponding SPS PDSCH reception with an SPS configuration index of 1 (lowest among 1 and 8).

In some aspects, for either set $S_0$ or set $S_1$, UE 820 may generate a HARQ-ACK bit for whichever set corresponds to a lowest SPS configuration among sets that are jointly released. In set $S_0$, HARQ-ACK for DCI may be the same as for a corresponding SPS PDSCH reception with an SPS configuration index of 0. Alternatively, in set $S_0$, a location of HARQ-ACK for the DCI may be the same as for a corresponding SPS PDSCH reception with the lowest SPS configuration index that is associated with a CORESET pool index of 0. In the example above, HARQ-ACK for the DCI may be the same as for a corresponding SPS PDSCH reception with an SPS-configuration index of 0.

UE 820 may determine locations for HARQ-ACK bits based at least in part on SPS configuration indices. In some aspects, UE 820 may generate one bit for HARQ-ACK feedback for a DCI. For example, UE 820 may receive an SPS release DCI that releases one or more of the first SPS configuration index associated with the first CORESET pool index value and the second SPS configuration index associated with the second CORESET pool index value. UE 820 may generate a HARQ-ACK bit for the SPS release DCI, where a location of the HARQ-ACK bit in the HARQ-Ack message corresponds to a location for an SPS PDSCH reception of an SPS configuration index determined by a lowest SPS configuration index of the first SPS configuration index and the second SPS configuration index. UE 820 may transmit a HARQ-ACK message with the HARQ-ACK bit.

In some aspects, UE 820 may receive an SPS release DCI that releases one or more of the first SPS configuration index associated with the first CORESET pool index value and the second SPS configuration index associated with the second CORESET pool index value. UE 820 may generate a HARQ-ACK bit for the SPS release DCI, where a location of the HARQ-ACK bit in the HARQ-ACK message corresponds to a location for an SPS PDSCH reception of the first SPS configuration index. UE 820 may transmit a HARQ-ACK message with the HARQ-ACK bit.

As described above, because rules are defined for scenarios of multi-DCI based mTRP, a UE may have more clarity when handling multiple SPS configurations and providing HARQ-ACK feedback. UE and TRP communications benefit from better SPS selection and better HARQ-ACK feedback.

As indicated above, FIG. 8 is provided as an example. Other examples may differ from what is described with respect to FIG. 8.

Figure 9:
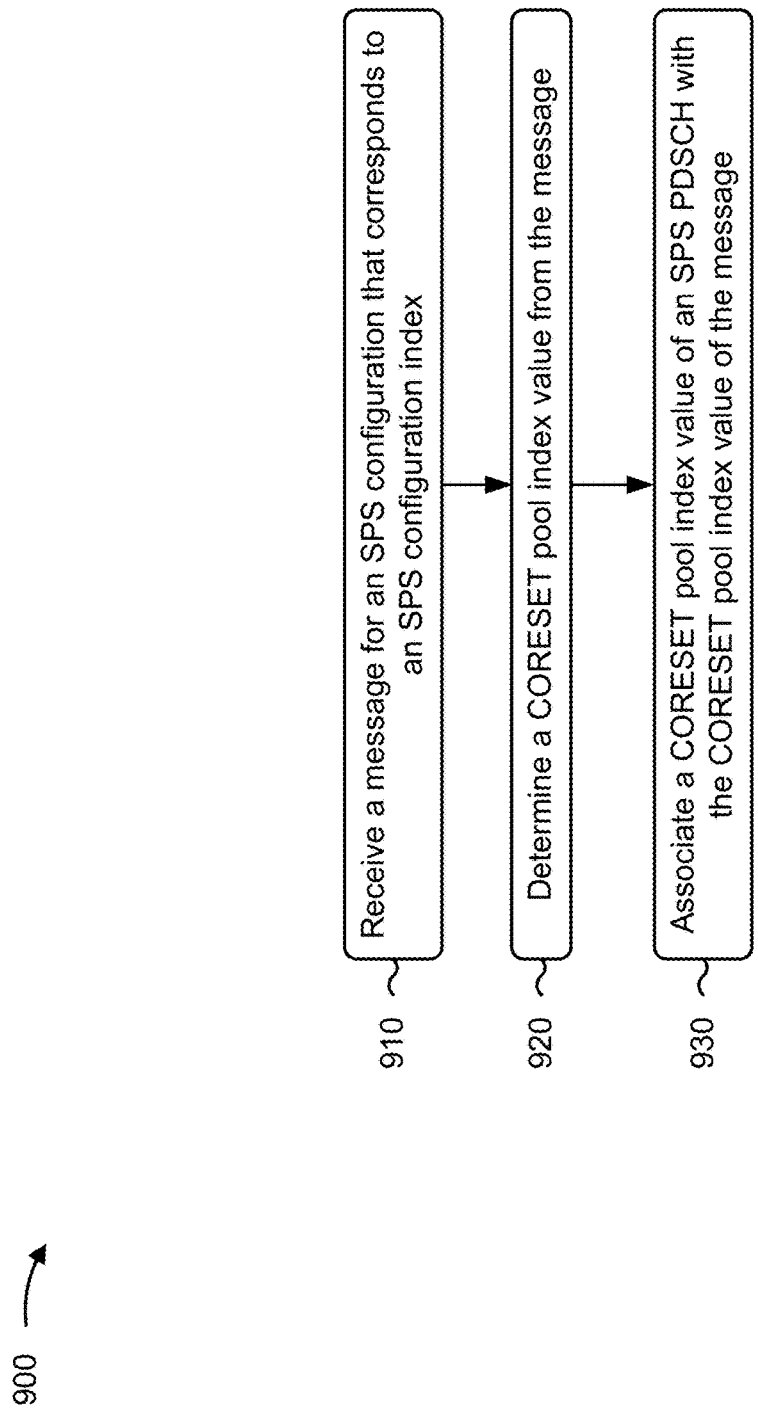
FIG. 9 is a diagram illustrating an example process performed, for example, by a UE, in accordance with the present disclosure.

FIG. 9 is a diagram illustrating an example process 900 performed, for example, by a UE, in accordance with various aspects of the present disclosure. Example process 900 is an example where the UE (e.g., UE 120 depicted in FIGS. 1, 2, and 4, UE 720 depicted in FIG. 7, UE 820 depicted in FIG. 8) performs operations associated with overlapping SPS for multiple TRPs.

As shown in FIG. 9, in some aspects, process 900 may include receiving a message for an SPS configuration that corresponds to an SPS configuration index (block 910). For example, the UE (e.g., using receive processor 258, transmit processor 264, controller/processor 280, memory 282) may receive a message for an SPS configuration that corresponds to an SPS configuration index, as described above.

As further shown in FIG. 9, in some aspects, process 900 may include determining a CORESET pool index value from the message (block 920). For example, the UE (e.g., using receive processor 258, transmit processor 264, controller/processor 280, memory 282) may determine a CORESET pool index value from the message, as described above.

As further shown in FIG. 9, in some aspects, process 900 may include associating a CORESET pool index value of an SPS PDSCH with the CORESET pool index value of the message (block 930). For example, the UE (e.g., using receive processor 258, transmit processor 264, controller/processor 280, memory 282) may associate a CORESET pool index value of an SPS PDSCH with the CORESET pool index value of the message, as described above.

Process 900 may include additional aspects, such as any single aspect or any combination of aspects described below and/or in connection with one or more other processes described elsewhere herein.

In a first aspect, process 900 includes activating the SPS configuration that corresponds to the SPS configuration index.

In a second aspect, alone or in combination with the first aspect, the message includes DCI in a CORESET for activating the SPS configuration, and determining the CORESET pool index value from the message includes determining a CORESET pool index value of the CORE-SET.

In a third aspect, alone or in combination with one or more of the first and second aspects, the CORESET pool index value of the SPS PDSCH is 0 (zero) based at least in part on a determination that the CORESET pool index value for the CORESET is 0, or the CORESET pool index value of the SPS PDSCH is 1 (one) based at least in part on a determination that the CORESET pool index value for the CORE-SET is 1.

In a fourth aspect, alone or in combination with one or more of the first through third aspects, process 900 includes receiving another DCI message, in a CORESET with a CORESET pool index value of 1, and activating a new SPS configuration with the SPS configuration index, based at least in part on a determination that the CORESET pool index value for the CORESET is 0.

In a fifth aspect, alone or in combination with one or more of the first through fourth aspects, process 900 includes releasing the SPS configuration and activating the new SPS configuration.

In a sixth aspect, alone or in combination with one or more of the first through fifth aspects, process 900 includes transmitting a UE capability report indicating one or more of a maximum quantity of SPS configuration indices in a BWP of a component carrier or a maximum quantity of uplink configured grant configuration indices in a BWP of a component carrier.

In a seventh aspect, alone or in combination with one or more of the first through sixth aspects, process 900 includes transmitting a UE capability report indicating one or more of a maximum quantity of SPS configurations in a BWP of a component carrier or a maximum quantity of uplink configured grant configurations in a BWP of a component carrier.

In an eighth aspect, alone or in combination with one or more of the first through seventh aspects, process 900 includes transmitting a UE capability report indicating one or more of a maximum quantity of SPS configurations across a plurality of component carriers or a maximum quantity of UL-CG configurations across a plurality of component carriers.

In a ninth aspect, alone or in combination with one or more of the first through eighth aspects, determining the CORESET pool index value from the message includes receiving the CORESET pool index value in an RRC message.

In a tenth aspect, alone or in combination with one or more of the first through ninth aspects, the CORESET pool index value in the RRC message is one of 0 or 1.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
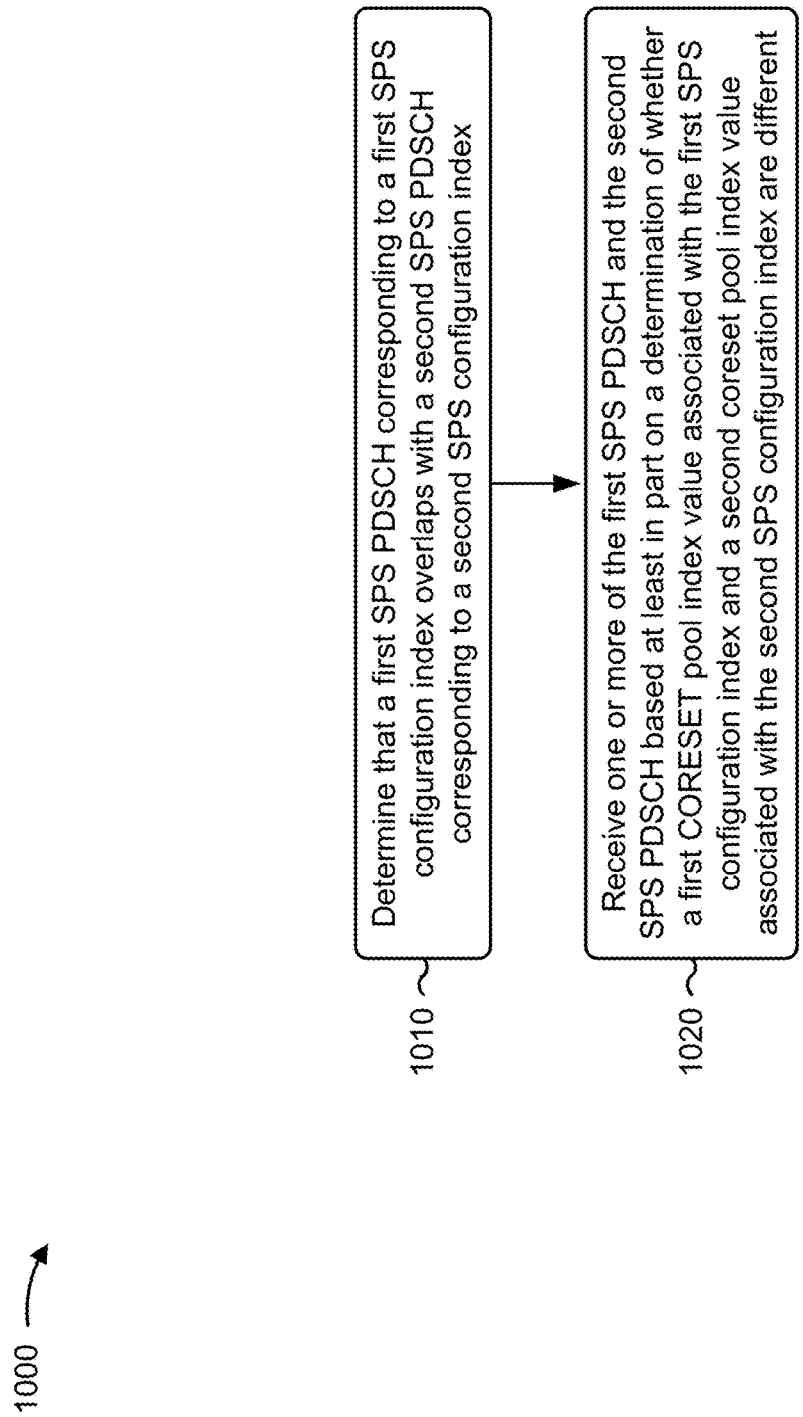
FIG. 10 is a diagram illustrating an example process performed, for example, by a UE, in accordance with the present disclosure.

FIG. 10 is a diagram illustrating an example process 1000 performed, for example, by a UE, in accordance with various aspects of the present disclosure. Example process 1000 is an example where the UE (e.g., UE 120 depicted in FIGS. 1, 2, and 4, UE 720 depicted in FIG. 7, UE 820 depicted in FIG. 8) performs operations associated with overlapping SPS for multiple TRPs.

As shown in FIG. 10, in some aspects, process 1000 may include determining that a first SPS PDSCH corresponding to a first SPS configuration index overlaps with a second SPS PDSCH corresponding to a second SPS configuration index (block 1010). For example, the UE (e.g., using receive processor 258, transmit processor 264, controller/processor 280, memory 282) may determine that a first SPS PDSCH corresponding to a first SPS configuration index overlaps with a second SPS PDSCH corresponding to a second SPS configuration index, as described above.

As further shown in FIG. 10, in some aspects, process 1000 may include receiving one or more of the first SPS PDSCH and the second SPS PDSCH based at least in part on a determination of whether a first CORESET pool index value associated with the first SPS configuration index and a second CORESET pool index value associated with the second SPS configuration index are different (block 1020). For example, the UE (e.g., using receive processor 258, transmit processor 264, controller/processor 280, memory 282) may receive one or more of the first SPS PDSCH and the second SPS PDSCH based at least in part on a determination of whether a first CORESET pool index value associated with the first SPS configuration index and a second CORESET pool index value associated with the second SPS configuration index are different, as described above.

Process 1000 may include additional aspects, such as any single aspect or any combination of aspects described below and/or in connection with one or more other processes described elsewhere herein.

In a first aspect, receiving the one or more of the first SPS PDSCH and the second SPS PDSCH includes receiving both the first SPS PDSCH and the second SPS PDSCH based at least in part on a determination that the first CORESET pool index and the second CORESET pool index are different.

In a second aspect, alone or in combination with the first aspect, receiving the one or more of the first SPS PDSCH and the second SPS PDSCH includes receiving only one of the first SPS PDSCH and the second SPS PDSCH based at least in part on a determination that the first CORESET pool index and the second CORESET pool index are the same.

In a third aspect, alone or in combination with one or more of the first and second aspects, receiving the one or more of the first SPS PDSCH and the second SPS PDSCH includes receiving, if the first SPS PDSCH and the second SPS PDSCH overlap in time, whichever of the first SPS PDSCH and the second SPS PDSCH correspond to a lowest SPS configuration index, based at least in part on a determination that the first CORESET pool index and the second CORE-SET pool index are the same.

In a fourth aspect, alone or in combination with one or more of the first through third aspects, process 1000 includes generating first HARQ-ACK feedback for the first SPS PDSCH and second HARQ-ACK feedback for the second SPS PDSCH, and transmitting a HARQ-ACK message that includes the first HARQ-ACK feedback and the second HARQ-ACK feedback.

In a fifth aspect, alone or in combination with one or more of the first through fourth aspects, HARQ-ACK feedback for an SPS PDSCH associated with a CORESET pool index of 0 (zero) is concatenated before HARQ-ACK feedback for an SPS PDSCH associated with a CORESET pool index of 1 (one).

In a sixth aspect, alone or in combination with one or more of the first through fifth aspects, process 1000 includes appending the first HARQ-ACK feedback and the second HARQ-ACK feedback to an end of a dynamic HARQ-ACK codebook.

In a seventh aspect, alone or in combination with one or more of the first through sixth aspects, process 1000 includes receiving an SPS release message in a CORESET, and releasing one or more SPS configurations associated with a CORESET pool index value that matches a CORESET pool index value of the CORESET.

In an eighth aspect, alone or in combination with one or more of the first through seventh aspects, process 1000 includes generating HARQ-ACK feedback for the SPS release, and transmitting a HARQ-ACK message including a first part associated with a first CORESET pool index value and a second part associated with a second CORESET pool index value, where the HARQ-ACK feedback is included in either the first part or the second part based at least in part on the CORESET pool index value of the CORESET.

In a ninth aspect, alone or in combination with one or more of the first through eighth aspects, process 1000 includes receiving an SPS release DCI that releases one or more of the first SPS configuration index associated with the first CORESET pool index value and the second SPS configuration index associated with the second CORESET pool index value, generating a first HARQ-ACK bit for the first SPS configuration index and a second HARQ-ACK bit for the second SPS configuration index, and transmitting a HARQ-ACK message including a first part associated with the first CORESET pool index value and a second part associated with the second CORESET pool index value, where the first HARQ-ACK bit is included in the first part and the second HARQ-ACK bit is included in the second part.

In a tenth aspect, alone or in combination with one or more of the first through ninth aspects, process 1000 includes receiving an SPS release DCI that releases one or more of the first SPS configuration index associated with the first CORESET pool index value and the second SPS configuration index associated with the second CORESET pool index value, generating a HARQ-ACK bit for the SPS release DCI, where a location of the HARQ-ACK bit in a HARQ-ACK message corresponds to a location for an SPS PDSCH reception of an SPS configuration index determined by a lowest SPS configuration index of the first SPS configuration index and the second SPS configuration index, and transmitting the HARQ-ACK message with the HARQ-ACK bit.

In an eleventh aspect, alone or in combination with one or more of the first through tenth aspects, process 1000 includes receiving an SPS release DCI that releases one or more of the first SPS configuration index associated with the first CORESET pool index value and the second SPS configuration index associated with the second CORESET pool index value, generating a HARQ-ACK bit for the SPS release DCI, where a location of the HARQ-ACK bit in a HARQ-ACK message corresponds to a location for an SPS PDSCH reception of the first SPS configuration index based at least in part on the first SPS configuration index being associated with the first CORESET pool index value, and transmitting the HARQ-ACK message with the HARQ-ACK bit.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
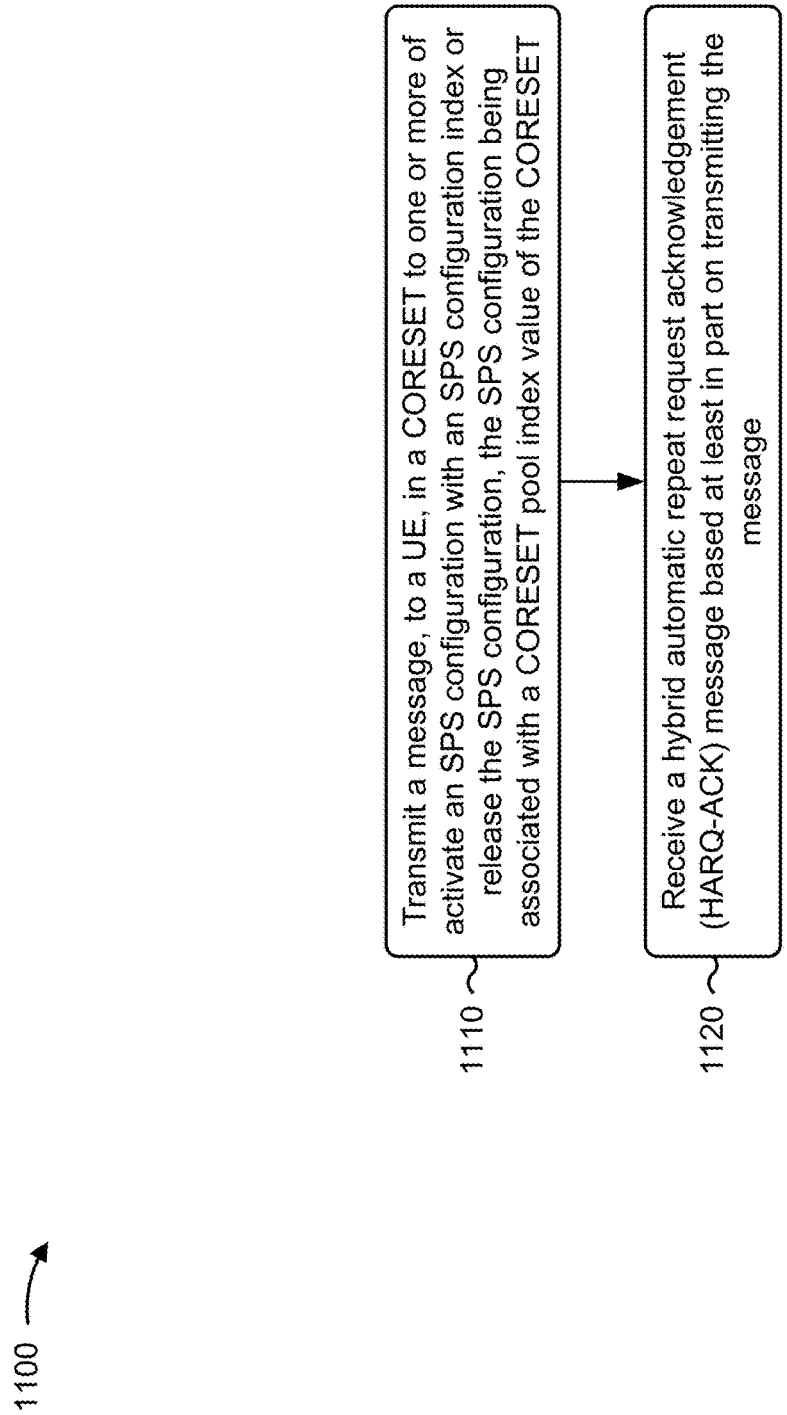
FIG. 11 is a diagram illustrating an example process performed, for example, by a base station, in accordance with the present disclosure.

FIG. 11 is a diagram illustrating an example process 1100 performed, for example, by a base station, in accordance with various aspects of the present disclosure. Example process 1100 is an example where the base station (e.g., BS 110 depicted in FIGS. 1 and 2, TRP 405 depicted in FIG. 4, BS 710 depicted in FIG. 7, BS 810 depicted in FIG. 8) performs operations associated with overlapping SPS for multiple TRPs.

As shown in FIG. 11, in some aspects, process 1100 may include transmitting a message, to a UE, in a CORESET to one or more of activate an SPS configuration with an SPS configuration index or release the SPS configuration (block 1110). In some aspects, the SPS configuration may be associated with a CORESET pool index value of the CORESET. For example, the base station (e.g., using transmit processor 220, receive processor 238, controller/processor 240, memory 242) may transmit a message, to a UE, in a CORESET to one or more of activate an SPS configuration with an SPS configuration index or release the SPS configuration, as described above.

As further shown in FIG. 11, in some aspects, process 1100 may include receiving a HARQ-ACK message based at least in part on transmitting the message (block 1120). For example, the base station (e.g., using transmit processor 220, receive processor 238, controller/processor 240, memory 242) may receive a HARQ-ACK message based at least in part on transmitting the message, as described above.

Process 1100 may include additional aspects, such as any single aspect or any combination of aspects described below and/or in connection with one or more other processes described elsewhere herein.

In a first aspect, process 1100 includes receiving a UE capability report indicating a maximum quantity of SPS configuration indices in a BWP of a component carrier, and determining a maximum quantity of SPS configurations based at least in part on the maximum quantity of SPS configuration indices and a determination of whether a component carrier is configured for multi-DCI-based mTRP communication.

In a second aspect, alone or in combination with the first aspect, process 1100 includes receiving a UE capability report indicating a maximum quantity of UL-CG indices in a BWP of a component carrier, and determining a maximum quantity of UL-CG configurations based at least in part on the maximum quantity of UL-CG configuration indices and a determination of whether a component carrier is configured for multi-DCI-based mTRP communication.

In a third aspect, alone or in combination with one or more of the first and second aspects, first HARQ-ACK feedback and second HARQ-ACK feedback are concatenated in the HARQ-ACK message, and the first HARQ-ACK feedback corresponds to a first SPS PDSCH and the second HARQ-ACK feedback corresponds to a second SPS PDSCH.

In a fourth aspect, alone or in combination with one or more of the first through third aspects, HARQ-ACK feedback for an SPS PDSCH associated with a CORESET pool index of 0 (zero) is concatenated before HARQ-ACK feedback for an SPS PDSCH associated with a CORESET pool index of 1 (one).

In a fifth aspect, alone or in combination with one or more of the first through fourth aspects, the first HARQ-ACK feedback and the second HARQ-ACK feedback are appended to an end of a dynamic HARQ-ACK codebook.

In a sixth aspect, alone or in combination with one or more of the first through fifth aspects, transmitting the message includes transmitting the message to release a plurality of SPS configurations, and the HARQ-ACK message includes a first HARQ-ACK bit for a first SPS configuration index and a second HARQ-ACK bit for a second SPS configuration index.

In a seventh aspect, alone or in combination with one or more of the first through sixth aspects, transmitting the message includes transmitting the message to release a plurality of SPS configurations, and the HARQ-ACK message includes a HARQ-ACK bit that corresponds to a lowest SPS configuration index of a first SPS configuration index and a second SPS configuration index.

In an eighth aspect, alone or in combination with one or more of the first through seventh aspects, a location of the HARQ-ACK bit in the HARQ-ACK message corresponds to a location for an SPS PDSCH reception of an SPS configuration index determined by the lowest SPS configuration index of the first SPS configuration index and the second SPS configuration index.

In a ninth aspect, alone or in combination with one or more of the first through eighth aspects, a location of the HARQ-ACK bit in the HARQ-ACK message corresponds to a location for an SPS PDSCH reception of the first SPS configuration index.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

The following provides an overview of some Aspects of the present disclosure:

Aspect 1: A method of wireless communication performed by a user equipment (UE), comprising: receiving a message for a semi-persistent scheduling (SPS) configuration that corresponds to an SPS configuration index; determining a control resource set (CORESET) pool index value from the message; and associating a CORESET pool index value of an SPS physical downlink shared channel (PDSCH) with the CORESET pool index value of the message.

Aspect 2: The method of Aspect 1, further comprising activating the SPS configuration that corresponds to the SPS configuration index.

Aspect 3: The method of Aspect 1 or 2, wherein the message includes downlink control information (DCI) in a CORESET for activating the SPS configuration, and wherein determining the CORESET pool index value from the message includes determining a CORESET pool index value of the CORESET.

Aspect 4: The method of Aspect 3, wherein the CORESET pool index value of the SPS PDSCH is 0 (zero) based at least in part on a determination that the CORESET pool index value for the CORESET is 0, or the CORESET pool index value of the SPS PDSCH is 1 (one) based at least in part on a determination that the CORESET pool index value for the CORESET is 1.

Aspect 5: The method of Aspect 3, further comprising: receiving another DCI message, in a CORESET with a CORESET pool index value of 1; and activating a new SPS configuration with the SPS configuration index, based at least in part on a determination that the CORESET pool index value for the CORESET is 0.

Aspect 6: The method of Aspect 5, further comprising releasing the SPS configuration and activating the new SPS configuration.

Aspect 7: The method of any of Aspects 1-6, further comprising transmitting a UE capability report indicating one or more of a maximum quantity of SPS configuration indices in a bandwidth part of a component carrier or a maximum quantity of uplink configured grant configuration indices in a bandwidth part of a component carrier.

Aspect 8: The method of any of Aspects 1-7, further comprising transmitting a UE capability report indicating one or more of a maximum quantity of SPS configurations in a bandwidth part of a component carrier or a maximum quantity of uplink configured grant configurations in a bandwidth part of a component carrier.

Aspect 9: The method of any of Aspects 1-8, further comprising transmitting a UE capability report indicating one or more of a maximum quantity of SPS configurations across a plurality of component carriers or a maximum quantity of uplink configured grant configurations across a plurality of component carriers.

Aspect 10: The method of any of Aspects 1-3, wherein determining the CORESET pool index value from the message includes receiving the CORESET pool index value in a radio resource control (RRC) message.

Aspect 11: The method of Aspect 10, wherein the CORESET pool index value in the RRC message is one of 0 or 1.

Aspect 12: A method of wireless communication performed by a user equipment (UE), comprising: determining that a first semi-persistent scheduling (SPS) physical downlink shared channel (PDSCH) corresponding to a first SPS configuration index overlaps with a second SPS PDSCH corresponding to a second SPS configuration index; and receiving one or more of the first SPS PDSCH and the second SPS PDSCH based at least in part on a determination of whether a first control resource set (CORESET) pool index value associated with the first SPS configuration index and a second CORESET pool index value associated with the second SPS configuration index are different.

Aspect 13: The method of Aspect 12, wherein receiving the one or more of the first SPS PDSCH and the second SPS PDSCH includes receiving both the first SPS PDSCH and the second SPS PDSCH based at least in part on a determination that the first CORESET pool index and the second CORESET pool index are different.

Aspect 14: The method of Aspect 12 or 13, wherein receiving the one or more of the first SPS PDSCH and the second SPS PDSCH includes receiving only one of the first SPS PDSCH and the second SPS PDSCH based at least in part on a determination that the first CORESET pool index and the second CORESET pool index are the same.

Aspect 15: The method of Aspect 14, wherein receiving the one or more of the first SPS PDSCH and the second SPS PDSCH includes receiving one of the first SPS PDSCH and the second SPS PDSCH corresponding to a lowest SPS configuration index.

Aspect 16: The method of Aspect 12 or 13, wherein receiving the one or more of the first SPS PDSCH and the second SPS PDSCH includes receiving, if the first SPS PDSCH and the second SPS PDSCH overlap in time, whichever of the first SPS PDSCH and the second SPS PDSCH correspond to a lowest SPS configuration index, based at least in part on a determination that the first CORESET pool index and the second CORESET pool index are the same.

Aspect 17: The method of Aspect 12 or 13, further comprising: generating first hybrid automatic repeat request acknowledgement (HARQ-ACK) feedback for the first SPS PDSCH and second HARQ-ACK feedback for the second SPS PDSCH; and transmitting a HARQ-ACK message that includes the first HARQ-ACK feedback and the second HARQ-ACK feedback.

Aspect 18: The method of Aspect 17, wherein HARQ-ACK feedback for an SPS PDSCH associated with a CORESET pool index of 0 (zero) is concatenated before HARQ-ACK feedback for an SPS PDSCH associated with a CORESET pool index of 1 (one).

Aspect 19: The method of Aspect 17, further comprising appending the first HARQ-ACK feedback and the second HARQ-ACK feedback to an end of a dynamic HARQ-ACK codebook.

Aspect 20: The method of any of Aspects 12-19, further comprising: receiving an SPS release message in a CORESET; and releasing one or more SPS configurations associated with a CORESET pool index value that matches a CORESET pool index value of the CORESET.

Aspect 21: The method of Aspect 20, further comprising: generating hybrid automatic repeat request acknowledgement (HARQ-ACK) feedback for the SPS release; and transmitting a HARQ-ACK message including a first part associated with a first CORESET pool index value and a second part associated with a second CORESET pool index value, wherein the HARQ-ACK feedback is included in either the first part or the second part based at least in part on the CORESET pool index value of the CORESET.

Aspect 22: The method of any of Aspects 12-19, further comprising: receiving an SPS release DCI that releases one or more of the first SPS configuration index associated with the first CORESET pool index value and the second SPS configuration index associated with the second CORESET pool index value; generating a first hybrid automatic repeat request acknowledgement (HARQ-ACK) bit for the first SPS configuration index and a second HARQ-ACK bit for the second SPS configuration index; and transmitting a HARQ-ACK message including a first part associated with the first CORESET pool index value and a second part associated with the second CORESET pool index value, wherein the first HARQ-ACK bit is included in the first part and the second HARQ-ACK bit is included in the second part.

Aspect 23: The method of any of Aspects 12-21, further comprising: receiving an SPS release DCI that releases one or more of the first SPS configuration index associated with the first CORESET pool index value and the second SPS configuration index associated with the second CORESET pool index value; generating a hybrid automatic repeat request acknowledgement (HARQ-ACK) bit for the SPS release DCI, wherein a location of the HARQ-ACK bit in a HARQ-ACK message corresponds to a location for an SPS PDSCH reception of an SPS configuration index determined by a lowest SPS configuration index of the first SPS configuration index and the second SPS configuration index; and transmitting the HARQ-ACK message with the HARQ-ACK bit.

Aspect 24: The method of any of Aspects 12-21, further comprising: receiving an SPS release DCI that releases one or more of the first SPS configuration index associated with the first CORESET pool index value and the second SPS configuration index associated with the second CORESET pool index value; generating a hybrid automatic repeat request acknowledgement (HARQ-ACK) bit for the SPS release DCI, wherein a location of the HARQ-ACK bit in a HARQ-ACK message corresponds to a location for an SPS PDSCH reception of the first SPS configuration index based at least in part on the first SPS configuration index being associated with the first CORESET pool index value; and transmitting the HARQ-ACK message with the HARQ-ACK bit.

Aspect 25: A method of wireless communication performed by a base station, comprising: transmitting a message, to a user equipment (UE), in a control resource set (CORESET) to one or more of activate a semi-persistent scheduling (SPS) configuration with an SPS configuration index or release the SPS configuration, the SPS configuration being associated with a CORESET pool index value of the CORESET; and receiving a hybrid automatic repeat request acknowledgement (HARQ-ACK) message based at least in part on transmitting the message.

Aspect 26: The method of Aspect 25, further comprising: receiving a UE capability report indicating a maximum quantity of SPS configuration indices in a bandwidth part of a component carrier; and determining a maximum quantity of SPS configurations based at least in part on the maximum quantity of SPS configuration indices and a determination of whether a component carrier is configured for multi-downlink control information based multiple transmit receive point communication.

Aspect 27: The method of Aspect 25 or 26, further comprising: receiving a UE capability report indicating a maximum quantity of uplink configured grant configuration (UL-CG) indices in a bandwidth part of a component carrier; and determining a maximum quantity of UL-CG configurations based at least in part on the maximum quantity of UL-CG configuration indices and a determination of whether a component carrier is configured for multi-downlink control information based multiple transmit receive point communication.

Aspect 28: The method of any of Aspects 25-27, wherein first HARQ-ACK feedback and second HARQ-ACK feedback are concatenated in the HARQ-ACK message, and wherein the first HARQ-ACK feedback corresponds to a first SPS physical downlink shared channel (PDSCH) and the second HARQ-ACK feedback corresponds to a second SPS PDSCH.

Aspect 29: The method of Aspect 28, wherein HARQ-ACK feedback for an SPS PDSCH associated with a CORESET pool index of 0 (zero) is concatenated before HARQ-ACK feedback for an SPS PDSCH associated with a CORESET pool index of 1 (one).

Aspect 30: The method of Aspect 28, wherein the first HARQ-ACK feedback and the second HARQ-ACK feedback are appended to an end of a dynamic HARQ-ACK codebook.

Aspect 31: The method of Aspect 28, wherein transmitting the message includes transmitting the message to release a plurality of SPS configurations, and wherein the HARQ-ACK message includes a first HARQ-ACK bit for a first SPS configuration index and a second HARQ-ACK bit for a second SPS configuration index.

Aspect 32: The method of Aspect 28, wherein transmitting the message includes transmitting the message to release a plurality of SPS configurations, and wherein the HARQ-ACK message includes a HARQ-ACK bit that corresponds to a lowest SPS configuration index of a first SPS configuration index and a second SPS configuration index.

Aspect 33: The method of Aspect 32, wherein a location of the HARQ-ACK bit in the HARQ-ACK message corresponds to a location for an SPS PDSCH reception of an SPS configuration index determined by the lowest SPS configuration index of the first SPS configuration index and the second SPS configuration index.

Aspect 34: The method of Aspect 32, wherein a location of the HARQ-ACK bit in the HARQ-ACK message corresponds to a location for an SPS PDSCH reception of the first SPS configuration index.

Aspect 35: An apparatus for wireless communication at a device, comprising a processor; memory coupled with the processor; and instructions stored in the memory and executable by the processor to cause the apparatus to perform the method of one or more Aspects of Aspects 1-34.

Aspect 36: A device for wireless communication, comprising a memory and one or more processors coupled to the memory, the memory and the one or more processors configured to perform the method of one or more Aspects of Aspects 1-34.

Aspect 37: An apparatus for wireless communication, comprising at least one means for performing the method of one or more Aspects of Aspects 1-34.

Aspect 38: A non-transitory computer-readable medium storing code for wireless communication, the code comprising instructions executable by a processor to perform the method of one or more Aspects of Aspects 1-34.

Aspect 39: A non-transitory computer-readable medium storing a set of instructions for wireless communication, the set of instructions comprising one or more instructions that, when executed by one or more processors of a device, cause the device to perform the method of one or more Aspects of Aspects 1-34.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to:
        transmit a UE capability report indicating one or more of:
            a maximum quantity of semi-persistent scheduling (SPS) configuration indices in a bandwidth part of a component carrier,
            a maximum quantity of uplink configured grant configuration indices in a bandwidth part of a component carrier,
            a maximum quantity of SPS configurations in a bandwidth part of a component carrier,
            a maximum quantity of uplink configured grant configurations in a bandwidth part of a component carrier,
            a maximum quantity of SPS configurations across a plurality of component carriers, or
            a maximum quantity of uplink configured grant configurations across a plurality of component carriers;
        receive a message for an SPS configuration that corresponds to an SPS configuration index;
        determine a control resource set (CORESET) pool index value from the message; and
        associate a CORESET pool index value of an SPS physical downlink shared channel (PDSCH) with the CORESET pool index value of the message.

2. The UE of claim 1, wherein the one or more processors are configured to activate the SPS configuration that corresponds to the SPS configuration index.

3. The UE of claim 1, wherein the message includes downlink control information (DCI) in a CORESET for activating the SPS configuration, and wherein the one or more processors, to determine the CORESET pool index value from the message, are configured to determine a CORESET pool index value of the CORESET.

4. The UE of claim 3, wherein the CORESET pool index value of the SPS PDSCH is 0 (zero) based at least in part on a determination that the CORESET pool index value for the CORESET is 0, or the CORESET pool index value of the SPS PDSCH is 1 (one) based at least in part on a determination that the CORESET pool index value for the CORESET is 1.

5. The UE of claim 3, wherein the one or more processors are configured to:
receive another DCI message, in a CORESET with a CORESET pool index value of 1; and
activate a new SPS configuration with the SPS configuration index, based at least in part on a determination that the CORESET pool index value for the CORESET is 0.

6. The UE of claim 5, wherein the one or more processors are configured to release the SPS configuration and activate the new SPS configuration.

7. The UE of claim 1, wherein the one or more processors, to determine the CORESET pool index value from the message, are configured to receive the CORESET pool index value in a radio resource control (RRC) message.

8. The UE of claim 7, wherein the CORESET pool index value in the RRC message is one of 0 or 1.

9. A method for wireless communication performed by a user equipment (UE), comprising:
transmitting a UE capability report indicating one or more of:
a maximum quantity of semi-persistent scheduling (SPS) configuration indices in a bandwidth part of a component carrier,
a maximum quantity of uplink configured grant configuration indices in a bandwidth part of a component carrier,
a maximum quantity of SPS configurations in a bandwidth part of a component carrier,
a maximum quantity of uplink configured grant configurations in a bandwidth part of a component carrier,
a maximum quantity of SPS configurations across a plurality of component carriers, or
a maximum quantity of uplink configured grant configurations across a plurality of component carriers;
receiving a message for an SPS configuration that corresponds to an SPS configuration index;
determining a control resource set (CORESET) pool index value from the message; and
associating a CORESET pool index value of an SPS physical downlink shared channel (PDSCH) with the CORESET pool index value of the message.

10. The method of claim 9, further comprising:
activating the SPS configuration that corresponds to the SPS configuration index.

11. The method of claim 9, wherein the message includes downlink control information (DCI) in a CORESET for activating the SPS configuration, and wherein determining the CORESET pool index value from the message includes determining a CORESET pool index value of the CORESET.

12. The method of claim 11, wherein the CORESET pool index value of the SPS PDSCH is 0 (zero) based at least in part on a determination that the CORESET pool index value for the CORESET is 0, or the CORESET pool index value of the SPS PDSCH is 1 (one) based at least in part on a determination that the CORESET pool index value for the CORESET is 1.

13. The method of claim 11, further comprising:
receiving another DCI message, in a CORESET with a CORESET pool index value of 1; and
activating a new SPS configuration with the SPS configuration index, based at least in part on a determination that the CORESET pool index value for the CORESET is 0.

14. The method of claim 13, further comprising:
releasing the SPS configuration and activating the new SPS configuration.

15. The method of claim 9, wherein determining the CORESET pool index value from the message comprises:
receiving the CORESET pool index value in a radio resource control (RRC) message.

16. The method of claim 15, wherein the CORESET pool index value in the RRC message is one of 0 or 1.

17. A non-transitory computer-readable medium storing one or more instructions for wireless communication, wherein the one or more instructions, when executed by one or more processors of a user equipment (UE), cause the one or more processors to:
transmit a UE capability report indicating one or more of:
a maximum quantity of semi-persistent scheduling (SPS) configuration indices in a bandwidth part of a component carrier,
a maximum quantity of uplink configured grant configuration indices in a bandwidth part of a component carrier,
a maximum quantity of SPS configurations in a bandwidth part of a component carrier a maximum quantity of uplink configured grant configurations in a bandwidth part of a component carrier,
a maximum quantity of SPS configurations across a plurality of component carriers, or
a maximum quantity of uplink configured grant configurations across a plurality of component carriers;
receive a message for an SPS configuration that corresponds to an SPS configuration index;
determine a control resource set (CORESET) pool index value from the message; and
associate a CORESET pool index value of an SPS physical downlink shared channel (PDSCH) with the CORESET pool index value of the message.

18. The non-transitory computer-readable medium of claim 17, wherein the one or more instructions, when executed by the one or more processors of the UE, cause the one or more processors to:
activate the SPS configuration that corresponds to the SPS configuration index.

19. The non-transitory computer-readable medium of claim 17, wherein the message includes downlink control information (DCI) in a CORESET for activating the SPS configuration, and wherein the one or more instructions, when executed by the one or more processors of the UE to determine the CORESET pool index value from the message, cause the one or more processors to:
determine a CORESET pool index value of the CORESET.

20. The non-transitory computer-readable medium of claim 17, wherein the one or more instructions, when executed by the one or more processors of the UE to determine the CORESET pool index value from the message, cause the one or more processors to:
    receive the CORESET pool index value in a radio resource control (RRC) message.

21. The non-transitory computer-readable medium of claim 20, wherein the CORESET pool index value in the RRC message is one of 0 or 1.

22. The non-transitory computer-readable medium of claim 19, wherein the CORESET pool index value of the SPS PDSCH is 0 (zero) based at least in part on a determination that the CORESET pool index value for the CORESET is 0, or the CORESET pool index value of the SPS PDSCH is 1 (one) based at least in part on a determination that the CORESET pool index value for the CORESET is 1.

23. The non-transitory computer-readable medium of claim 19, wherein the one or more instructions, when executed by the one or more processors of the UE, cause the one or more processors to:
    receive another DCI message, in a CORESET with a CORESET pool index value of 1; and
    activate a new SPS configuration with the SPS configuration index, based at least in part on a determination that the CORESET pool index value for the CORESET is 0.

24. The non-transitory computer-readable medium of claim 23, wherein the one or more instructions, when executed by the one or more processors of the UE, cause the one or more processors to:
    release the SPS configuration and activate the new SPS configuration.

* * * * *